(12) United States Patent
Helms

(10) Patent No.: US 11,933,164 B2
(45) Date of Patent: Mar. 19, 2024

(54) FLUID PARTICULATE CONCENTRATOR FOR ENHANCED SENSING IN A WELLBORE FLUID

(71) Applicant: Halliburton Energy Services, Inc., Houston, TX (US)

(72) Inventor: Lonnie Carl Helms, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 227 days.

(21) Appl. No.: 17/526,822

(22) Filed: Nov. 15, 2021

(65) Prior Publication Data
US 2023/0151729 A1 May 18, 2023

(51) Int. Cl.
| | |
|---|---|
| *E21B 47/11* | (2012.01) |
| *C09K 8/467* | (2006.01) |
| *E21B 33/14* | (2006.01) |

(52) U.S. Cl.
CPC ............ *E21B 47/11* (2020.05); *C09K 8/467* (2013.01); *E21B 33/14* (2013.01)

(58) Field of Classification Search
CPC ........ E21B 47/11; E21B 47/111; E21B 33/14; C09K 8/467
See application file for complete search history.

(56) References Cited

U.S. PATENT DOCUMENTS

| | | |
|---|---|---|
| 9,506,324 B2 | 11/2016 | Kyle et al. |
| 9,587,486 B2 | 3/2017 | Walton et al. |
| 9,920,620 B2 | 3/2018 | Murphree et al. |
| 10,221,653 B2 | 3/2019 | Walton et al. |
| 10,634,234 B2 | 4/2020 | Schilling |
| 11,060,400 B1 | 7/2021 | Jamison et al. |

(Continued)

FOREIGN PATENT DOCUMENTS

| | | |
|---|---|---|
| DE | 19912327 A1 | 9/2000 |
| DE | 102014204088 A1 | 9/2015 |
| DE | 102016217242 A1 | 3/2018 |
| WO | 2017171556 A1 | 10/2017 |
| WO | 2020089587 A1 | 5/2020 |

OTHER PUBLICATIONS

Specification and Drawings for U.S. Appl. No. 17/009,546, filed Sep. 1, 2020, titled "Magnetic Permeability Sensor With Permanent Magnet For Downhole Sensing," 34 pages.

(Continued)

*Primary Examiner* — Catherine Loikith
(74) *Attorney, Agent, or Firm* — Conley Rose, P.C.; Rodney B. Carroll

(57) ABSTRACT

A flow diverter having a first conical section, a second conical section, and support legs. The first conical section comprises an outside surface tapering from a first end to a second end. The first end of the first conical section comprises a rounded nose. The second conical section comprises an outside surface tapering from a first end to a second end. The first end of the second conical section comprises a rounded nose. The second end of the first section can contact or be integrated with the second end of the second section, or an intermediate section can be positioned therebetween. The intermediate section can comprise a substantially cylindrical outer surface extending from the second end of the first conical section to the second end of the second conical section. The support legs are configured to fixedly couple the flow diverter to a tubular.

20 Claims, 12 Drawing Sheets

(56) References Cited

U.S. PATENT DOCUMENTS

| | | |
|---|---|---|
| 2003/0029611 A1 | 2/2003 | Owens |
| 2003/0056952 A1 | 3/2003 | Stegemeier et al. |
| 2003/0192695 A1 | 10/2003 | Dillenbeck et al. |
| 2009/0107769 A1 | 4/2009 | Sato et al. |
| 2013/0048290 A1 | 2/2013 | Howell et al. |
| 2013/0048291 A1 | 2/2013 | Merron et al. |
| 2013/0264051 A1 | 10/2013 | Kyle et al. |
| 2016/0258280 A1 | 9/2016 | Murphree et al. |
| 2016/0369571 A1* | 12/2016 | Banerjee ............ E21B 43/2406 |
| 2017/0204719 A1 | 7/2017 | Babakhani |
| 2018/0030824 A1 | 2/2018 | Roberson et al. |
| 2019/0249549 A1 | 8/2019 | Fripp et al. |
| 2021/0148204 A1 | 5/2021 | Stolboushkin et al. |
| 2021/0246759 A1 | 8/2021 | Cao et al. |

OTHER PUBLICATIONS

Specification and Drawings for U.S. Appl. No. 17/088,096, filed Nov. 3, 2020, titled "Reverse Cementing Floating Valve/Sliding Sleeve Mechanism for Reverse Cementing," 37 pages.

Specification and Drawings for U.S. Appl. No. 17/224,843, filed Apr. 7, 2021, titled "Loop Detector on Smart Shoe for Cementing Level Detection and Valve Control," 44 pages.

Foreign Communication from Related Application—International Search Report and Written Opinion of the International Searching Authority, International Application No. PCT/US2022/044334, dated Jan. 17, 2023, 13 pages.

Foreign Communication from Related Application—International Search Report and Written Opinion of the International Searching Authority, International Application No. PCT/US2020/048989, dated May 17, 2021, 10 pages.

\* cited by examiner

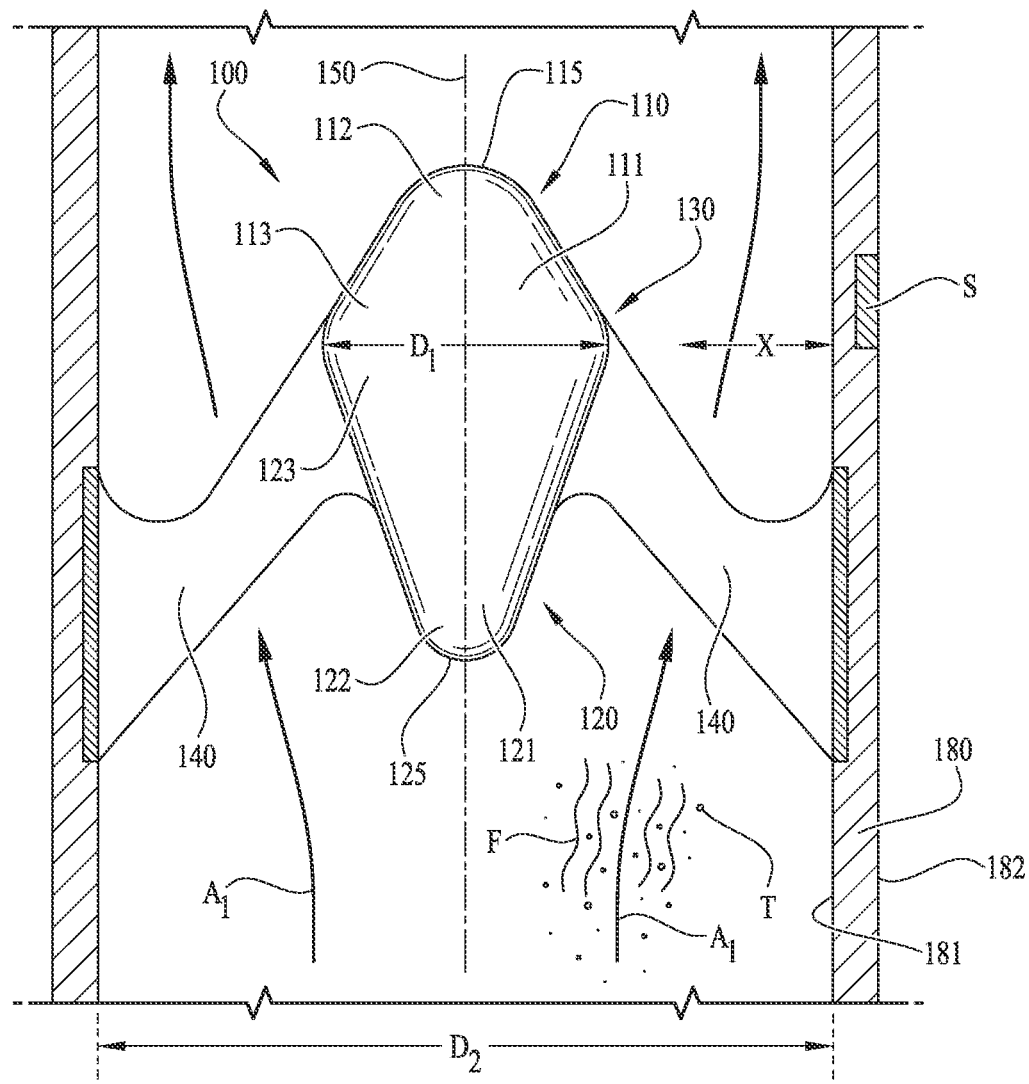
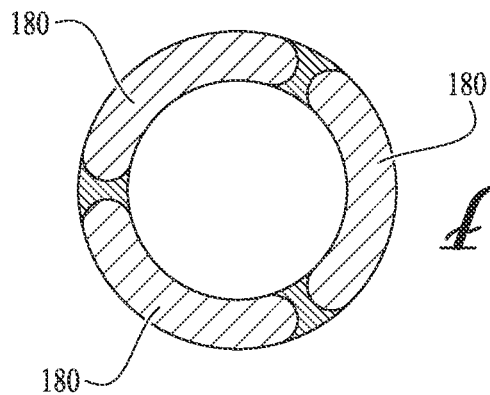

FLUID PARTICULATE CONCENTRATOR FOR ENHANCED SENSING IN A WELLBORE FLUID

TECHNICAL FIELD

The disclosure generally relates to the field of equipment utilized and operations performed in conjunction with a subterranean well and to (e.g., magnetic) sensing in well tools.

BACKGROUND

Reverse circulation cementing (hereinafter "reverse cementing") involves displacing fluids between the outside of a casing and a formation wall in a subterranean well operation. A sensor on the inner or outer diameter of the casing at or near the bottom of the wellbore detects when the cementing fluids reach the bottom of the wellbore and begin entering the inside of the casing through a flow port. In response, a signal is sent downhole to close a valve to prevent cementing fluids from ascending the inside of the casing. During reverse cementing operations, the cementing fluids are aided by gravity in reaching the bottom of the wellbore.

BRIEF DESCRIPTION OF THE DRAWINGS

Embodiments of the disclosure may be better understood by referencing the accompanying drawings.

FIG. 1A is a schematic side view of a flow diverter coupled with a tubular, according to embodiments of this disclosure;

FIG. 1B is a cross section of the flow diverter of FIG. 1A;

DESCRIPTION OF EMBODIMENTS

Figure 2A:
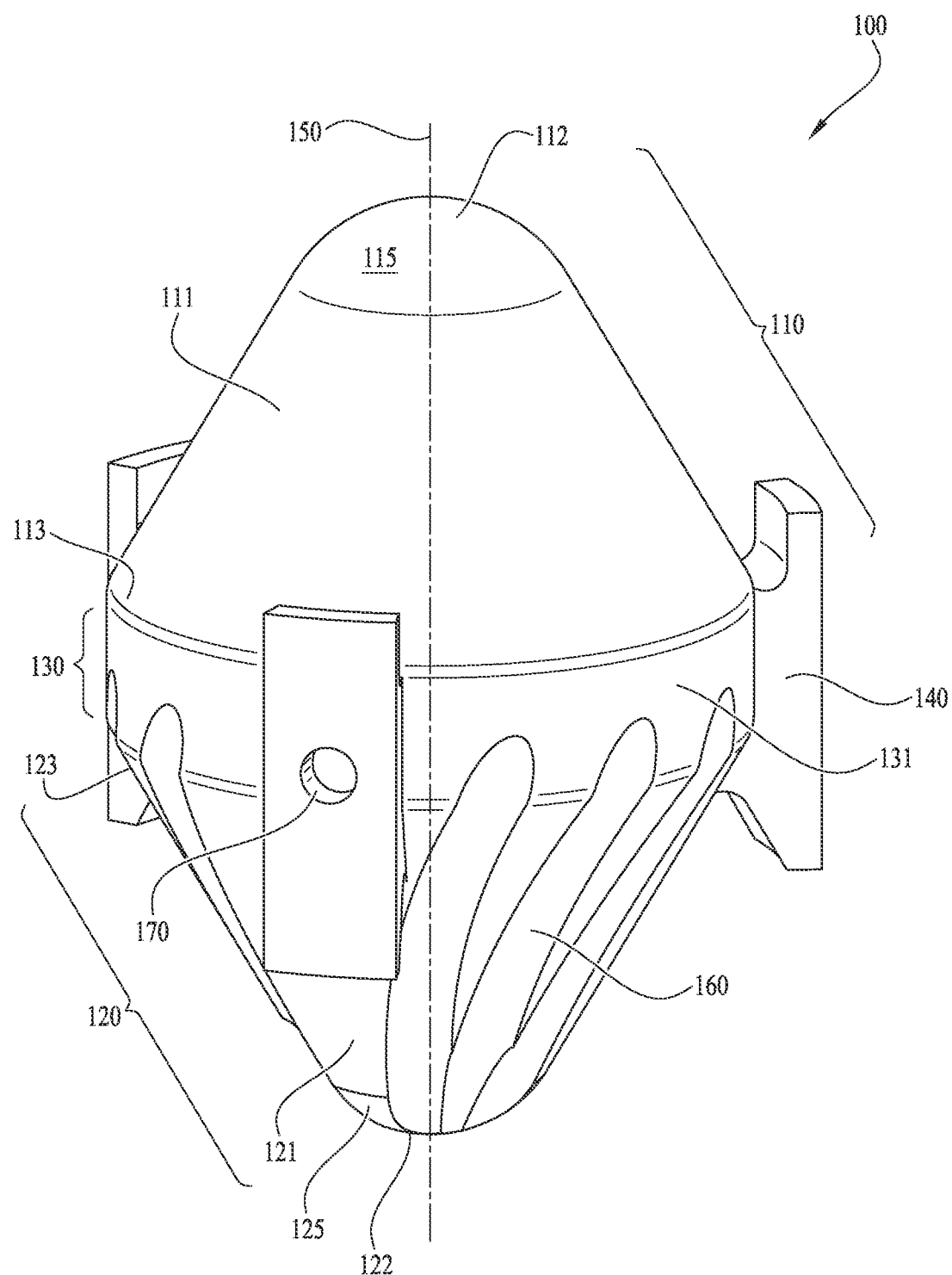
FIG. 2A is a schematic side view of a flow diverter, according to embodiments of this disclosure.

The description that follows includes example systems, methods, techniques, and program flows that embody embodiments of the disclosure. However, it is understood that this disclosure may be practiced without these specific details. For instance, this disclosure refers to measuring magnetic permeability of slurry during a reverse cementing operation in illustrative examples. Embodiments of this disclosure can be instead applied to measuring magnetic permeability of fluids or slurries during other subterranean wellbore operations including traditional cementing operations. In other instances, well-known instruction instances, protocols, structures, and techniques have not been shown in detail in order not to obfuscate the description.

In some downhole sensing systems, a sensor is built into the side wall of a downhole tool. The sensor can be utilized to sense solids distributed in the well fluids being pumped. Once sensed, sensing system can trigger a subsequent action, such as closing of a valve to prevent further flow. In such sensing systems, a certain concentration of detectable particulates is needed for accuracy of the sensor. Herein disclosed is a flow diverter (or "fluid particulate concentrator") configured to divert fluid flow toward a sensor of a sensing apparatus and thus increase a number of detectable particles within a detection range of a sensor of a sensing system. The flow diverter of this disclosure can be utilized to increase an effective concentration of detectable particles in proximity to the sensor (e.g., within a sensing range X of the sensor, described with reference to FIG. 1A hereinbelow) to more reliably determine a triggering point (e.g., when to close the valve or take other subsequent action).

The shape of the disclosed flow diverter is designed to radially divert the fluid being pumped outward from the center of a tubular or tool in which the flow diverter is disposed toward an inside wall of the tubular or housing of the tool in which a sensor is disposed. Thus, the flow diverter diverts fluid flow into closer proximity to the interior wall of the tool and closer to the sensor of the sensing apparatus. The fluid flowing past the flow diverter can contain particulates that are to be detected by the sensor. By diverting the fluid toward the inside diameter of the tool or tubular housing the sensor, a higher concentration of the particulates pass in a nearer proximity to (e.g., to within a detectable range of) the sensor, relative to applications absent the flow diverter. A higher effective concentration of particulates within the detection range of the sensor will increase the potential signal created by passing of the particulates.

Description of a flow diverter of this disclosure will now be provided with reference to FIG. 1A, which is a schematic side view of a flow diverter 100 coupled with a tubular or other housing 180 (referred to hereinafter simply as "tubular" 180), according to embodiments of this disclosure, and FIG. 1A, which is a cross section view of the flow diverter 100 of FIG. 1A coupled with tubular 180. Flow diverter 100 comprises a first conical section 110, a second conical section 120, and support structure or "support legs" 140. The first conical section 110 and the second conical section 120 are substantially conical in shape to facilitate flow of fluids thereover and direct fluids flowing thereover toward a sensor S of a sensing apparatus (e.g., a sensing apparatus as described hereinbelow with reference to FIGS. 3-11). Flow diverter 100 can further comprise an intermediate section 130 comprises a substantially cylindrical outer surface 131 extending from the second end 113 of the first conical section 110 to the second end 123 of the second conical section 120 (e.g., and having a diameter D1), or the second end 113 of the first conical section 110 can be integrated with the second end 223 of the second conical section 120.

The first conical section 110 can comprise an outside surface 111 tapering from a first end 112 of the first conical section 110 to a second end 113 of the first conical section 110. The first end 112 of the first conical section 110 can comprise a rounded nose 115. The second end 113 of the first conical section 110 can be substantially planar, in embodiments, or integrated with or contacting second end 223 of second conical section 120 or intermediate section 130. The second conical section 120 can comprise an outside surface 121 tapering from a first end 122 of the second conical section to a second end 123 of the second conical section. The first end 122 of the second conical section 120 can comprise a rounded nose 125. The second end 123 of the second conical section 120 can be substantially planar, in embodiments, or can be integrated with or contacting second end 113 of first conical section 120 or intermediate section 130. The intermediate section 130 or the section of flow diverter 100 where the first conical section 110 and the second conical section 120 meet, can have an outside diameter $D_1$, which is the widest part of first conical section 110, second conical section 120, and/or intermediate section 130. Intermediate section 130 can comprise a substantially cylindrical outer surface 131 extending from the second end 113 of the first conical section 110 to the second end 123 of the second conical section 120.

The support legs 140 are configured to fixedly couple the flow diverter 100 to a support, such as a tubular 180. The tubular 180 can comprise a casing, a casing shoe, a tool (such as downhole tool 174 described hereinbelow with reference to FIG. 8) having a body and a sensor S proximally located within the body. The support legs 140 can be configured to fixedly couple the flow diverter 100 to the tubular 180 (e.g., the support) such that a central axis 150 of the flow diverter 100 is substantially parallel to and/or coincident with a central axis 150 of the tubular 180.

Although described as a first conical section 110 and a second conical section 120, and an intermediate section 130, the first conical section 110, the second conical section 120, and the intermediate section 130 can be an integrated component, for example, flow diverter 100 can comprise an egg-shaped section providing the first conical section and the second conical section 120 and, optionally, an intermediate section 130. The intermediate section 130, when present, can have sides or outer surfaces 131 substantially parallel with central axis 150 (as shown and described further with reference to FIG. 2A and FIG. 2B, hereinbelow). Alternatively, the base of the cone of the first conical section 110 (e.g., second end 113 of first conical section 110) and the base of the cone of the second conical section 120 (e.g., second end 223 of the second conical section 120) can meet and/or be integrated, thus providing an intermediate section 130 having diameter $D_1$. That is, intermediate section 130 is not necessarily a separate region of flow diverter 100, but can be provided by the first conical section 110 and/or the second conical section 120.

With reference now to FIG. 2A, which is a schematic side view of a flow diverter 100, according to embodiments of this disclosure, and FIG. 213, which is a perspective view of the flow diverter 100 of FIG. 2A, a flow diverter 100 of this disclosure can further comprise one or more flow diverting features 260 configured to direct fluid flowing past the flow diverting features 260 toward an inside surface 181 of the tubular 180 (e.g., support), The first conical section 110, the second conical section 120, or both the first conical section 110 and the second conical section 120 can comprise one or more flow diverting features 260. The flow diverting features 260 can extend at least from the rounded nose 115 (and/or first end 112) of the first conical section 110 to the second end 113 of the first conical section 110, the rounded nose 125 (and/or first end 122) of the second conical section 120 to the second end 123 of the second conical section 120, or both from the rounded nose 115 (and/or first end 112) of the first conical section 110 to the second end 113 of the first conical section 110 and from the rounded nose 125 (and/or first end 122) of the second conical section to the second end 123 of the second conical section 120.

In embodiments, the flow diverting features 160 can extend: on outside surface 111 of first conical section 110 past the second end 113 of the first conical section 110 to the outside surface 131 of the intermediate section 130, on outside surface 121 of second conical section 120 past the second end 123 of the second conical section 120, or both on outside surface 111 of first conical section 110 past the second end 113 of the first conical section 110 to the outside surface 131 of the intermediate section 130 and on outside surface 121 of second conical section 120 past the second end 123 of the second conical section 120.

The flow diverting features can include any structure that facilitates diversion of fluid flowing over flow diverter 100 toward sensor S. For example, and without limitation, the flow diverting features 160 can include flutes, fins, ridges, vanes, recesses, protuberances, or a combination thereof.

In the embodiment of FIG. 1A, FIG. 1B, FIG. 2A, and FIG. 2B, flow diverter 100 comprises three support legs 140. However, a flow diverter 100 can include any number of support legs 160, for example, from about 1 to about 10 support legs, from about 2 to about 7 support legs, from about 3 to about 5 support legs, or 1, 2, 3, 4, 5, 6, 7, 8, 9, or 10 support legs 160. The flow diverter 100 can comprise a plurality (e.g., 2, 3, or more) support legs 160. The plurality of support legs 160 can be distributed substantially equidistantly around the outside surface 131 of the intermediate section 130, in embodiments.

A flow diverter 100 of this disclosure can comprise one or more flow diverting features 160 distributed, between each pair of support legs 140, about the outside surface 111 of the first conical section 110, the outside surface 121 of the second conical section 120, or about both the outside surface 111 of the first conical section 110 and the outside surface 121 of the second conical section 120.

Flow diverter 100 can be tailorable based on the size of the base tool being used (and in which flow diverter 100 can be housed), the density and rheology of the fluids being displaced, and the base concentration of the particulates in the fluids pumped. Flow diverter 100 can be molded out of thermoset plastic, although a very broad spectrum of materials can be utilized. In applications in which flow diverter 100 is to be drilled up after use, readily drillable materials can be desirable. These readily drillable materials can include thermoplastics, nylons, phenolics, 3D-printed elastomers, cast or wrought aluminum, and ceramics, among others. In embodiments in which flow diverter 100 is to be drilled up after use, the material can be selected such that conventional drill bits, roller cone bits, PDC bits, or other removal apparatus can readily penetrate through the material. In embodiments, flow diverter 100 can comprise (e.g., be manufactured from) a material selected from plastics, aluminum (e.g., cast aluminum, wrought aluminum), steel, or a combination thereof. In embodiments, the material comprises a phenolic or thermoset plastic.

As discussed further hereinbelow in Comparative Example 1 and Examples 1-3, the sizing of flow diverter 100 can be selected to provide a desired concentration of detectable particles within detection range X of sensor S. That is, the sizing of flow diverter 100 can be selected such that a meaningfully increased concentration of detectable particulates is provided within the detection range X of the sensor S. The diameter (e.g., diameter $D_1$) of the cones' bases (which can be integrated into a solid component) can be determined for the purpose of ensuring the concentrated amount of particulates is sufficient to be readily sensed by the sensor S. By way of example, for an 8.75 inch (") (22.2 cm) inside diameter 181 tool, a flow diverter 100 diameter $D_1$ of 4.00 inches (10.2 cm) can provide an approximate concentration increase of 1.4 times relative to simply flowing through a tubular 180 having an inside diameter $D_2$ of 8.75" (22.2 cm). Increasing the flow diverter 100 diameter $D_1$ to 6.00" (15.2 cm) increases the effective concentration to approximately twice the concentration relative to simply flowing through the tubular 180 having the inside diameter $D_2$ of 8.75" (22.2 cm). Utilizing a flow diverter 100 having a 7" (17.8 cm) diameter $D_1$, the effective concentration of detectable particles is nearly tripled relative to flow through the tubular 180 having the inside diameter $D_2$ of 8.75" (22.2 cm).

Figure 2B:
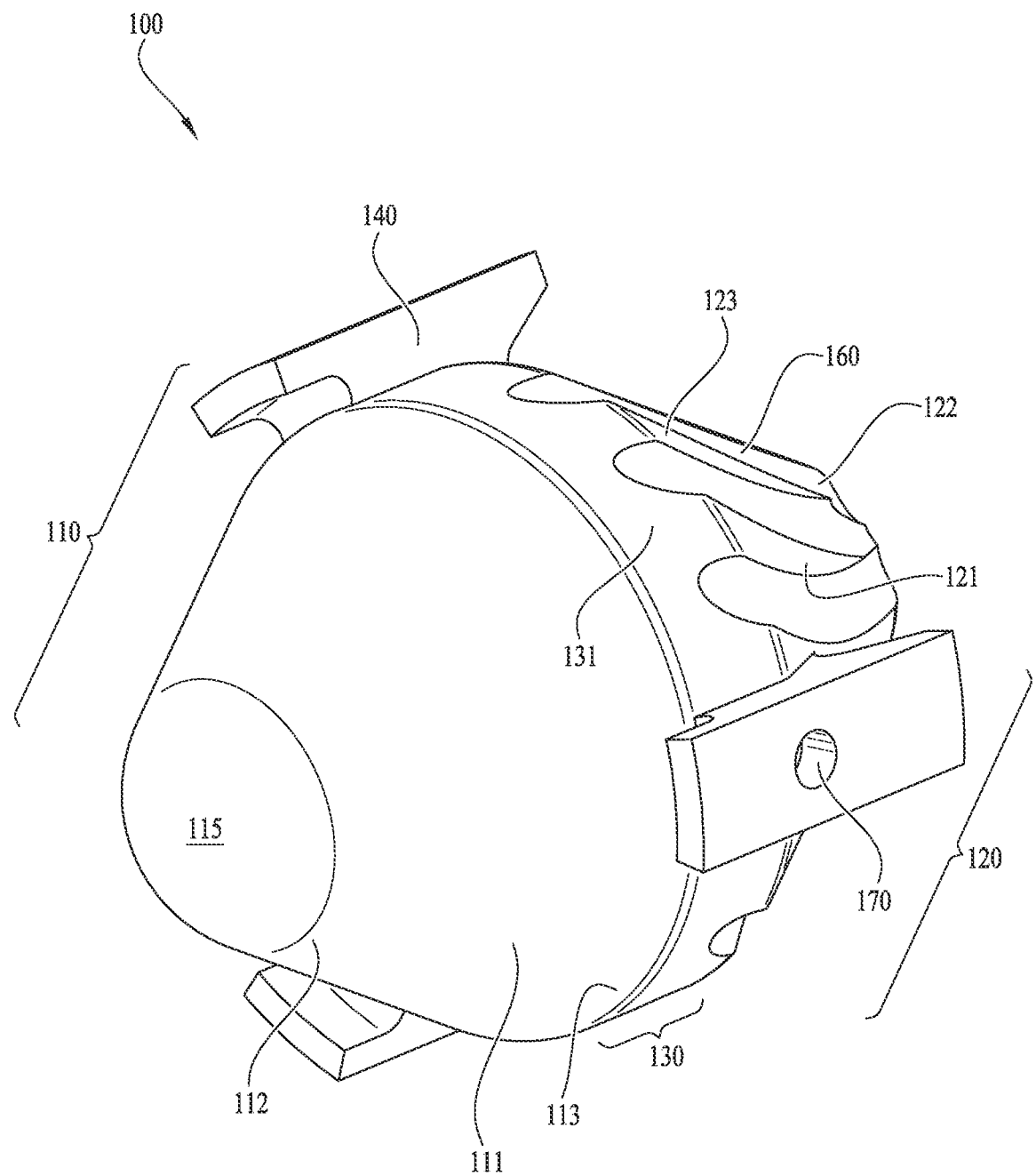
FIG. 2B is a perspective view of the flow diverter of FIG. 2A.

Flow diverter 100 is configured to divert the flow of wellbore servicing fluids passing thereover to a nearer proximity to the sensor S. The flow diverter 100 can be configured in a number of ways to achieve this outcome. As suggested in FIG. 1A. FIG. 1B, FIG. 2A, and FIG. 2B, the primary shape of the flow diverter or concentrator 100 can be two rounded cones (e.g., first conical section 110 and second conical section 120) held in place in the axial direction of a cylindrical tool housing (e.g., tubular 180). The bases of the two cones (e.g., second end 113 of first conical section 110 and second end 123 of second conical section 120) and/or the intermediate section 130, having the (widest) diameter $D_1$, can be in near proximity to the sensor S (which sensor S can be, for example, positional in the wall of the housing or tubular 180) (e.g., between inside surface 181 of tubular 180 and outside surface 182 of tubular 180). The double sided cone comprising first conical section 110 and second conical section 120 (and providing intermediate section 130) with rounded points or noses (e.g., nose or tip 115 of first conical section 120 and nose or tip 125 of second conical section 120) can be supported by 2, 3, or more supporting vanes or support legs 140 extending from the cones (e.g., of first conical section 110, second conical section 120) to the inside diameter or surface 181 of the housing or tubular 180. The leading and tailing edges of the vanes or support legs 140 can be contoured to provide the smooth flow of wellbore servicing fluid F past both the vanes or support legs 140 and the central double sided cone of the double conical concentrator or flow diverter 100.

The bi-directional shape of the flow diverter 100 depicted in FIG. 1A, FIG. 2A, and FIG. 2B can be utilized when fluids will flow in both directions (e.g., in the direction indicated generally by arrow A1 (e.g., bottom to top, passing second conical section 120 prior to first conical section 110)) in FIG. 1A and in a direction opposite the direction generally indicated by arrow A1 in FIG. 1A (e.g., top to bottom, passing first conical section 110 prior to second conical section 120))) during use (or "functional life") of the flow diverter 100. Reference to "bottom" and "top" in FIG. 1A indicates relative to the page, not necessarily that the second conical section 120 is below or at a bottom relative to first conical section 110 at a top of the flow diverter 100. Generally, second section 120 can be farther along a wellbore from a surface of the earth than first conical section 110, regardless of the design of the wellbore (e.g., horizontal, vertical, etc.). The functional life of flow diverter 100 can be expected to last from the time flow diverter 100 is run downhole (e.g., on a casing string) into a well until flow diverter 100 has reached target depth. During running downhole (e.g., running casing) and when at full depth, fluid can be pumped downhole past the flow diverter 100 in conventional flow (e.g., with reference to FIG. 8, described hereinbelow, into wellbore 712 from earth surface 704) or in combination with a reverse flow whereby fluids are pumped from the surface (704) down an annulus (740) and into the casing (e.g., tubular string 708) at the bottom of the wellbore (712). Flow diverter 100 can be utilized to indicate when the leading edge of a cement slurry has reached the sensor S, thereby triggering a subsequent action, such as the closure of a valve that prevents further flow. This will be described further hereinbelow with reference to FIGS. 3-11.

Also provided herein is a downhole tool (e.g., downhole tool 724 of FIG. 8, described further hereinbelow) comprising: the flow diverter 100 as described herein fixedly coupled with the tubular 180 (e.g., the support), and sensor S adjacent the flow diverter 100.

The flow diverter 100 can be fixedly coupled with the tubular 180 via one or more holes 170 on each of the support legs 140, although numerous other coupling means are intended to be within the scope of this disclosure. For example, in embodiments, the flow diverter 100 can be fixedly coupled with the tubular 180 via a set screw in each of the one or more holes 170 on each of the support legs 140.

In embodiments, the sensing apparatus is a magnetic permeability sensing apparatus comprising sensor S and further comprises a magnet. For example, as described hereinbelow with reference to FIG. 3, which is a schematic diagram of a flow diverter 100 according to embodiments of this disclosure being utilized in conjunction with a magnetic permeability sensor 209 in a reverse cementing operation with a permanent magnetic field, and FIG. 10, which is a schematic diagram of a flow diverter 100 according to embodiments of this disclosure and a magnetic permeability sensor 209 in a reverse cementing operation without a non-ferromagnetic plug 207, the sensing apparatus can comprise a magnetic permeability sensor 209, and a permanent magnet 211. Alternatively, as described hereinbelow with reference to FIG. 8, which is a schematic diagram of a drilling rig system 764 with a flow diverter 100 according to embodiments of this disclosure and a magnetic field sensor 752 and a permanent magnet 750, the sensing apparatus can comprise a permanent magnet 750 and a magnetic field sensor 752 as sensor S.

In embodiments, sensor S is a component of a low-cost magnetic permeability sensing apparatus ("sensing apparatus") that can withstand hostile subterranean environments and can be utilized for activating devices downhole based on magnetic permeability sensing, including activating a valve during reverse cementing operations. At designated stages of reverse cementing operations, a material with high magnetic permeability is added to a slurry to be sent downhole to enable a magnetic sensor S to detect the magnetic permeability of the slurry. The sensing apparatus is situated downhole near a flow port to detect the presence of a slurry with known magnetic permeability corresponding to the slurry sent downhole and to send a signal to close a valve (e.g., a sliding sleeve, ball valve, etc.) either at the flow port or across the cross section of an oilfield tubular. Once the known slurry is detected, an additional signal (e.g., a wired signal like through electric line or fiber optics, or a wireless signal such as a pressure rise, an acoustic signal, or the like) is sent by the sensing apparatus to a controller of the reverse cementing operations at the surface to stop flow of the current slurry and/or commence flow of a different slurry. In one application, the additional signal is a pressure rise associated with the increased flow resistance from the valve closing. The sensing apparatus comprises a magnet source (e.g., a permanent magnet or an electromagnet) and a magnetic sensor. The sensing apparatus is configured to detect specific ranges of magnetic permeability by inducing a magnetic field in the slurry to be read by the magnetic sensor. The magnetic sensor detects different slurries downhole based on different concentrations of the high magnetic permeability material in the slurry which results in magnetic fields with different strengths at the sensor. This sensing apparatus can be constructed from low cost materials even for operational conditions downhole and detects multiple types of cementing fluids using accurate measurements of magnetic permeability.

Figure 3:
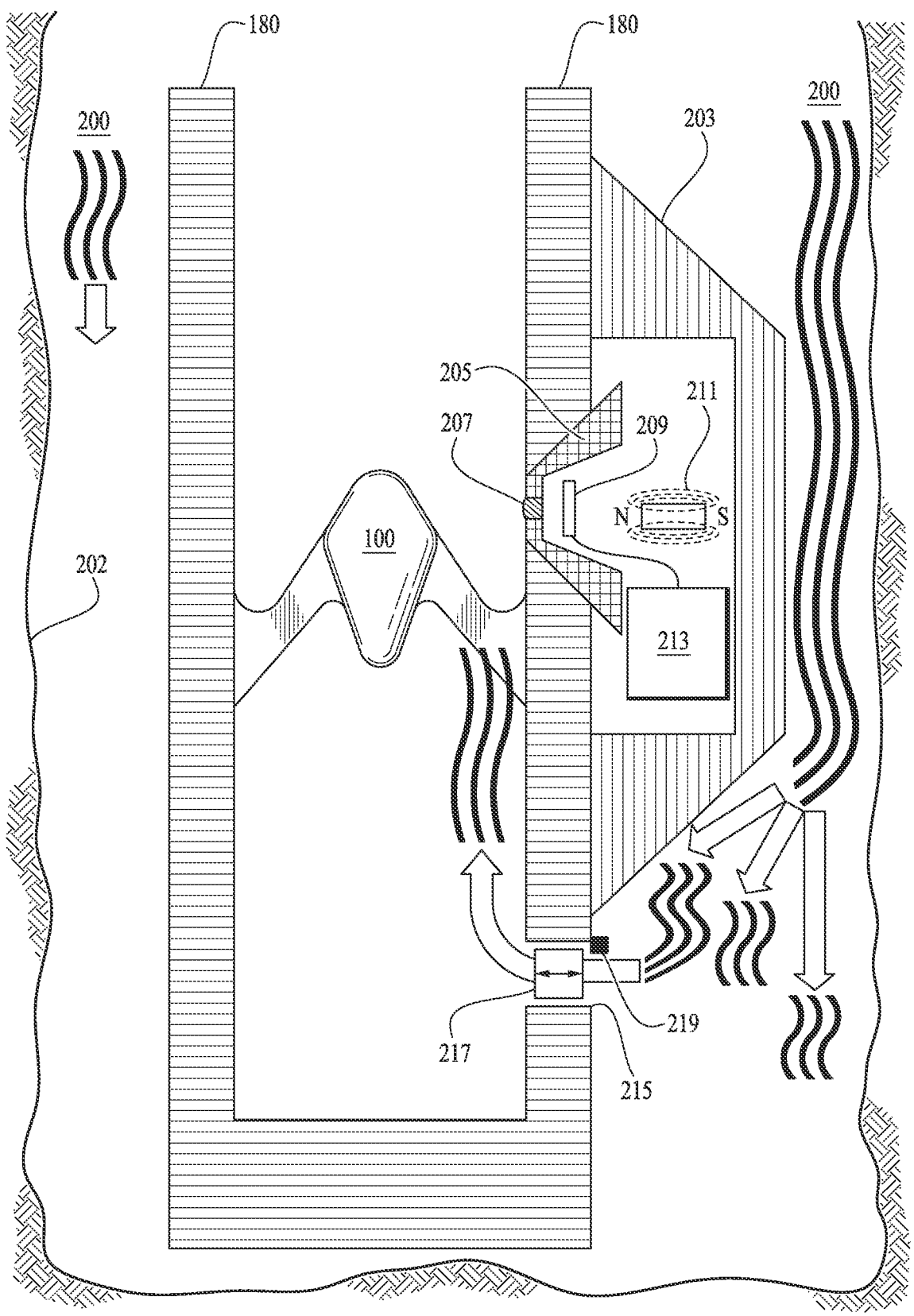
FIG. 3 is a schematic diagram of a flow diverter according to embodiments of this disclosure being utilized in conjunction with a magnetic permeability sensor in a reverse cementing operation with a permanent magnetic field.

By way of example, FIG. 3 is a schematic diagram of a flow diverter 100 according to embodiments of this disclosure being utilized in conjunction with a magnetic permeability sensor 209 in a reverse cementing operation with a permanent magnetic field. The magnetic permeability sensing apparatus comprises, as sensor S, the magnetic permeability sensor 209, and further comprises a permanent magnet 211. During reverse cementing operations, a slurry 200 of wellbore servicing fluid F (FIG. 1A) of cementing fluids flows outside an oilfield tubular 180, adjacent to a formation wall 202, and into a flow port 215 after which it is detected by the sensing apparatus. The sensing apparatus comprises a permanent magnet 211, a magnetic sensor 209, a computing device 213 coupled to the magnetic sensor 209, and a sensor housing 205 comprising an optional plug 207 made of a non-ferromagnetic material. The illustrated sensing apparatus also comprises a shield 203 that protects the sensing apparatus from the slurry 200 on the outside of the oilfield tubular 180. The magnetic sensor 209 is situated between the permanent magnet 211 and the sensor housing 205. In alternate embodiments, the magnetic sensor 209 is placed anywhere in the magnetic flux path. Flow diverter 100 is positioned within tubular 180 such that fluid flow over flow diverter 100 is directed toward sensor 209. The permanent magnet 211 is mechanically connected to the shield 203 (e.g., with an adhesive, magnetic attraction, threaded, press fit, etc.), to the sensor housing 205, or to the magnetic sensor 209 and positioned within the sensor housing 205 to induce a magnetic field outside of the sensor housing 205 into the interior of the oilfield tubular 180. The magnetic sensor 209 can be mechanically connected to the plug 207, the shield 203, the permanent magnet 211, or to the sensor housing 205 (e.g., with a fixture, adhesive, threaded connection, press fit, adhesive, etc.). The sensing apparatus is attached to or integrated into the oilfield tubular 180 and positioned so that the plug 207 creates a window to the interior of the oilfield tubular 180. The sensor housing 205 is positioned near the flow port 215 so that the presence of the slurry 200 is detected as the slurry 200 enters the interior of the oilfield tubular 180. In some cases, there is no separate plug 207 because the entire sensor housing 205 is non-ferromagnetic and serves as a magnetic window for the magnetic field. The window created by the plug 207 allows the magnetic sensor 209 to measure the magnetic permeability of the slurry 200 outside of the sensor housing 205, which experiences the magnetic field induced by the permanent magnet 211 through the plug 207 as it flows past the sensing apparatus. Once a permeability change from the cementing fluid is detected, the computing device 213 sends a signal to an actuating mechanism 219 to close a valve 217 at a flow port 215 in the oilfield tubular 180. The sensing apparatus pictured in FIG. 3 can be integrated into the oilfield tubular 180 prior to deployment downhole and can be powered on deployment of the oilfield tubular 180 to preserve battery power.

The plug 207 comprises any low-cost non-ferromagnetic material that allows the passage of the magnetic field (e.g., has low magnetic permeability) of the permanent magnet 211 as it passes through the plug 207 and into the slurry 200. For instance, the non-ferromagnetic material can be steel, titanium, aluminum, any alloys thereof such as INCONEL® alloy 718, plastics, composites, ceramics, glass, etc. The sensor housing 205 and shield 203 comprise any low-cost material that can protect the sensing apparatus under operational conditions (e.g., carbon steel, steel alloys, et cetera). The magnetic sensor 209 can be any sensor that detects the strength of a magnetic field or magnetic flux such as a giant magnetoresistance (GMR) sensor, Hall effect sensor, a microelectromechanical magnetic field sensor, magnetic force sensor, etc. A magnetic force sensor will be described during the exposition of FIG. 5. The measurements taken by the magnetic sensor 209 will increase in strength as the magnetic permeability of the slurry 200 increases due to the increased concentration of a high magnetic permeability material in the slurry 200. The slurry 200 comprises a detection slurry having a plurality of particles with a high magnetic permeability such as suspended iron particles, martensitic stainless-steel particles, ferritic particles, iron oxide particles, ferrofluid particles, or other particles with a high magnetic permeability in a fluid. As the magnetic permeability of the slurry 200 increases, the magnetic flux detected by the magnetic sensor 209 increases. In some applications, the particle size is between 1 nm and 2 mm.

In some applications, the computing device 213 can be calibrated to detect ranges or differences of magnetic permeability for the slurry 200. The accuracy of the calibration can be increased by simulating downhole conditions (temperature, pressure, flow rate, etc.) with different cementing fluids having different magnetic permeability. The computing device 213 can be programmed to detect each cementing fluid based on the magnetic strength measured by the magnetic sensor 209 during calibration. Once the computing device 213 detects a cementing fluid in the slurry 200, it sends a signal to the actuating mechanism 219 at the flow port 215 to stop fluid flow. In some embodiments, the computing device 213 may include a time delay before sending the signal to the actuating mechanism 219. Detection occurs when the computing device 213 determines that the measurements taken by the magnetic sensor 209 satisfy a detection criterion. This detection criterion can be that the magnetic flux is in a predetermined range as described above or that the magnetic field changes by a predetermined amount, indicating that a fluid of a different magnetic permeability is present (the amount of magnetic field can also be pre-calibrated). In response to a signal to stop fluid flow, the actuating mechanism 219 causes the valve 217 to close over the flow port 215 or across the diameter of the inside of the oilfield tubular 180. This valve 217 can be a sliding sleeve, a flapper, a ball valve, or any valve that can stop or can variably restrict fluid flow into the inside of the oilfield tubular 180 at operational conditions downhole. The valve 217 can be actuated by opening a flow port that allows the sleeve to shift into a closed position. For example, the sliding sleeve can be hydraulically locked in the open position and the actuation of an electronic rupture disc removes the hydraulic lock and allows the sleeve to close. The actuating mechanism 219 can be open or close a flow valve and this change in restriction in the valve results in a change in the flow port (either increased or decreased flow). In another application, the valve is on the inner diameter (ID) of the tubing and prevents axial flow up the tubing. In these applications, the valve on the ID of the tubing may be a ball valve or a flapper valve. In yet another application, the valve is on the outer diameter (OD) of the tubing and prevents axial flow down the annular space between the tubing and the formation. In this application, the valve on the OD of the tubing may be a packer.

Although depicted as a magnet, the permanent magnet 211 can be any source of magnetic flux and, in some embodiments, can be an electromagnet. For embodiments where the permanent magnet 211 is an electromagnet, the magnetic sensor 209 can detect inductance on the electromagnet (e.g., the electromagnet itself is the sensor) because the inductance of the electromagnet will vary with the magnetic permeability of the slurry 200. For instance, a capacitor placed in electrical series with the electromagnet will resonate at a frequency of hertz, where L is the inductance and C is the capacitance. Therefore, the magnetic permeability of the slurry 200 influences the resonant frequency of this circuit. The resonant frequency of the circuit can be measured, for example, by applying an electrical voltage pulse to the electromagnet, measuring the frequency of the induced voltage oscillations, and sending the frequency measurements to the computing device 213. The computing device can be pre-calibrated to detect ranges of resonant frequencies corresponding to different cementing fluids, or to detect changes in the resonant frequency that indicates a change of fluid downhole.

Figure 4:
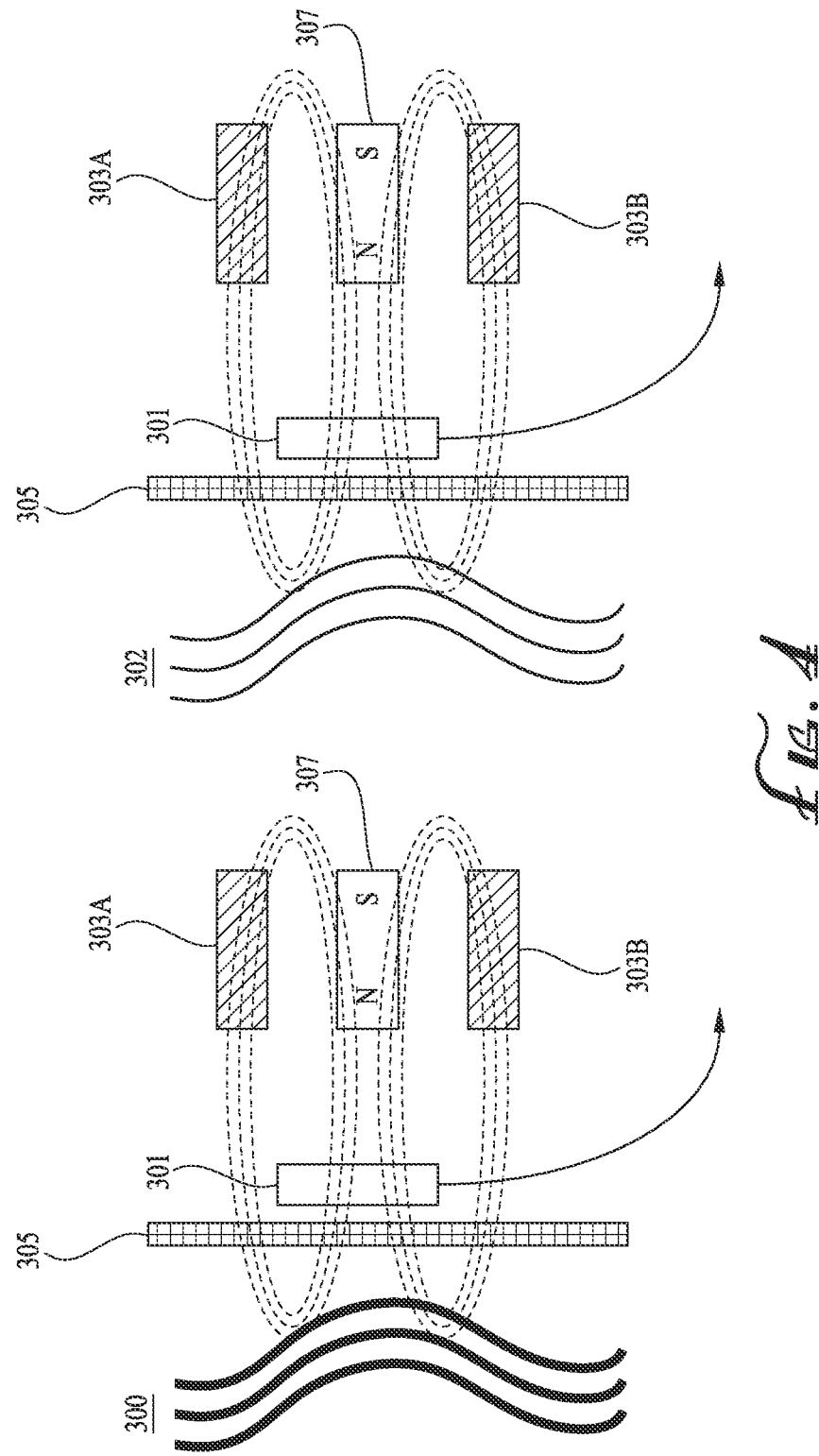
FIG. 4 is a schematic diagram of a magnetic field sensor for detecting slurries with varying concentrations of high magnetic permeability materials with a permanent magnet suitable for use with a flow diverter according to embodiments of this disclosure.

FIG. 4 is a schematic diagram of using a magnetic source (permanent magnet or an electromagnet) with a magnetic sensor for detecting slurries with varying concentrations of high magnetic permeability materials. A magnetic sensor 301 detects a high-permeability slurry 300 and a low-permeability slurry 302 via a magnetic field generated by a permanent magnet 307 that flows through a barrier 305 and is guided by flux return conduits 303A and 303B. The high-permeability slurry 300 comprises a cementing fluid that has been modified by adding a high magnetic permeability material such as an iron powder to distinguish it from the low-permeability slurry 302. The low-permeability slurry 302 can be a distinct cementing fluid from the high-permeability slurry 300 or can be an ambient fluid downhole (e.g., a completion brine or a drill mud). Typically, downhole fluids such as the low-permeability slurry 302 have a relative magnetic permeability $\mu_1$ of approximately 1, whereas the high-permeability slurry 300 has a higher relative magnetic permeability $\mu_2$ (e.g., 2 or greater) due to the addition of a ferromagnetic material. More than two cementing fluids corresponding to more than two magnetic permeability values are possible. The cementing fluids can be a cement, a spacer, a brine, a gel, a mud, or other fluids used in the cementing process.

The barrier 305 is made of a non-ferromagnetic material (e.g. austenitic steel, titanium, polymers, composites, aluminum, any alloys thereof such as INCONEL® alloy, etc.) so that it doesn't interfere with the magnetic field generated by the permanent magnet 307. The flux return conduits 303A and 303B are made of a ferromagnetic material and guide the magnetic field generated by the permanent magnet 307 in the direction of the magnetic sensor 301. When the slurry has a high magnetic permeability, such as the high-permeability slurry 300, an increased amount of the magnetic field will flow through the high-permeability slurry 300 and to the magnetic sensor 301, which will have a higher reading. Prior to deployment, the magnetic sensor 301 can be configured to detect ranges of magnetic strength (e.g., determine that measurement satisfies a detection criterion) for both the high-permeability slurry 300 and the low-permeability slurry 302 for the particular configuration of the barrier 305, the permanent magnet 307, and the flux return conduits 303A and 303B relative to the slurry at operational conditions downhole. Alternatively, the magnetic sensor 301 can be configured to detect a change in flux of the measured magnetic field sufficiently large to indicate the presence or absence of a cementing fluid. The magnetic sensor 301 is communicatively coupled to a computing device (not shown) that sends a signal to an actuating mechanism (not shown) that enables a valve to close that prevents flow or restricts flow of the slurry in response to the detection of a cementing fluid. The high-permeability slurry 300 and low-permeability slurry 302 can be inside an oilfield tubular or outside an oilfield tubular facing a formation wall, sufficiently close to a flow port to detect cementing fluid and send a signal to the actuating mechanism to stop fluid flow before or shortly after cementing fluid starts to run up the inside of the oilfield tubular.

Figure 5:
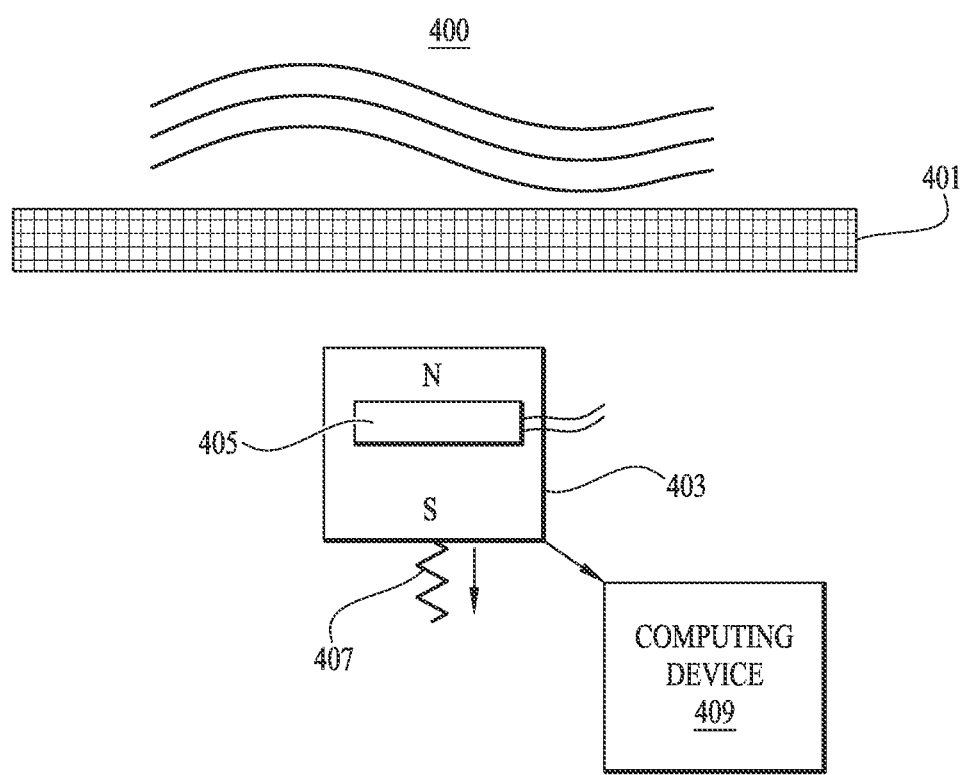
FIG. 5 is a schematic diagram of a permanent magnet with a tension measuring device to measure magnetic permeability of a slurry suitable for use with a flow diverter according to embodiments of this disclosure.

FIG. 5 is a schematic diagram of a magnet source with a magnetic sensor for measuring magnetic permeability of a slurry where the magnetic sensor is a magnetic force sensor. A magnet source 403 (e.g., a permanent magnet or an electromagnet) generates a magnetic field that flows through a barrier 401 to a slurry 400 and returns through the barrier 401 to the magnet source 403. When the slurry 400 has a high magnetic permeability, the magnet source 403 experiences an attractive force towards the slurry 400 that is measured by a magnetic force sensor 405. A spring 407 counteracts the attractive force acting on the magnet source 403 due to the increased magnetic field passing through the higher permeability fluid. The spring 407 keeps the magnet source 403 in place as indicated by the downwards arrow in FIG. 5. The magnetic force sensor 305 is communicatively coupled to a computing device 409 that receives tension measurements from the magnetic force sensor 405.

Although depicted as a spring 407, the magnetic source 403 can be affixed to a shield or housing, affixed to the barrier 401, or affixed to any other stationary component, or the spring 407 can be integrated into any other component that adds an opposing (downward) force to the magnet source 403. In some embodiments the spring 407 is replaced with another magnet, or with the stiffness of the magnetic force sensor 405. A compression measuring device could be used as a variation on the tension measurement device. Instead of the single magnet source 403, two magnets can be implemented with the magnetic force sensor 405 between them. Alternatively, a piece of iron or other ferromagnetic material can be placed under the magnetic force sensor 405 and the magnetic source 403 can be situated on top towards the ferromagnetic slurry 400. These embodiments allow the magnetic source 403 to be situated closer to the ferromagnetic slurry 400, resulting in a higher sensitivity to force of the magnetic flux through the ferromagnetic slurry 400.

The magnetic force sensor 405 can be any device that can measure the strength of the attractive force on the magnetic source 403. For example, the tension measuring device can comprise four strain gauges in a Wheatstone bridge configuration. The barrier 401 can be made of a non-ferromagnetic material, as described variously above. The computing device 409 is configured to detect the magnetic permeability of the ferromagnetic slurry 400 based on tension measurements received from the tension measuring device. A higher tension measurement means the magnetic source 403 experiences a stronger attractive force to the ferromagnetic slurry 400, because a higher magnetic force is exerted upon the magnetic source 403 indicating a higher magnetic permeability of the ferromagnetic slurry 400. The computing device 409 is calibrated to detect cementing fluids corresponding to certain ranges of force measurements (e.g., that the tension measurements satisfy a detection criterion) at operational conditions downhole or corresponding to an increase or decrease in the force measurements where the change is above or below thresholds. When a cementing fluid is detecting corresponding to the end of reverse cementing operations, the computing device 409 sends a signal to an actuating mechanism (not pictured) to stop the fluid flow.

Figure 6:
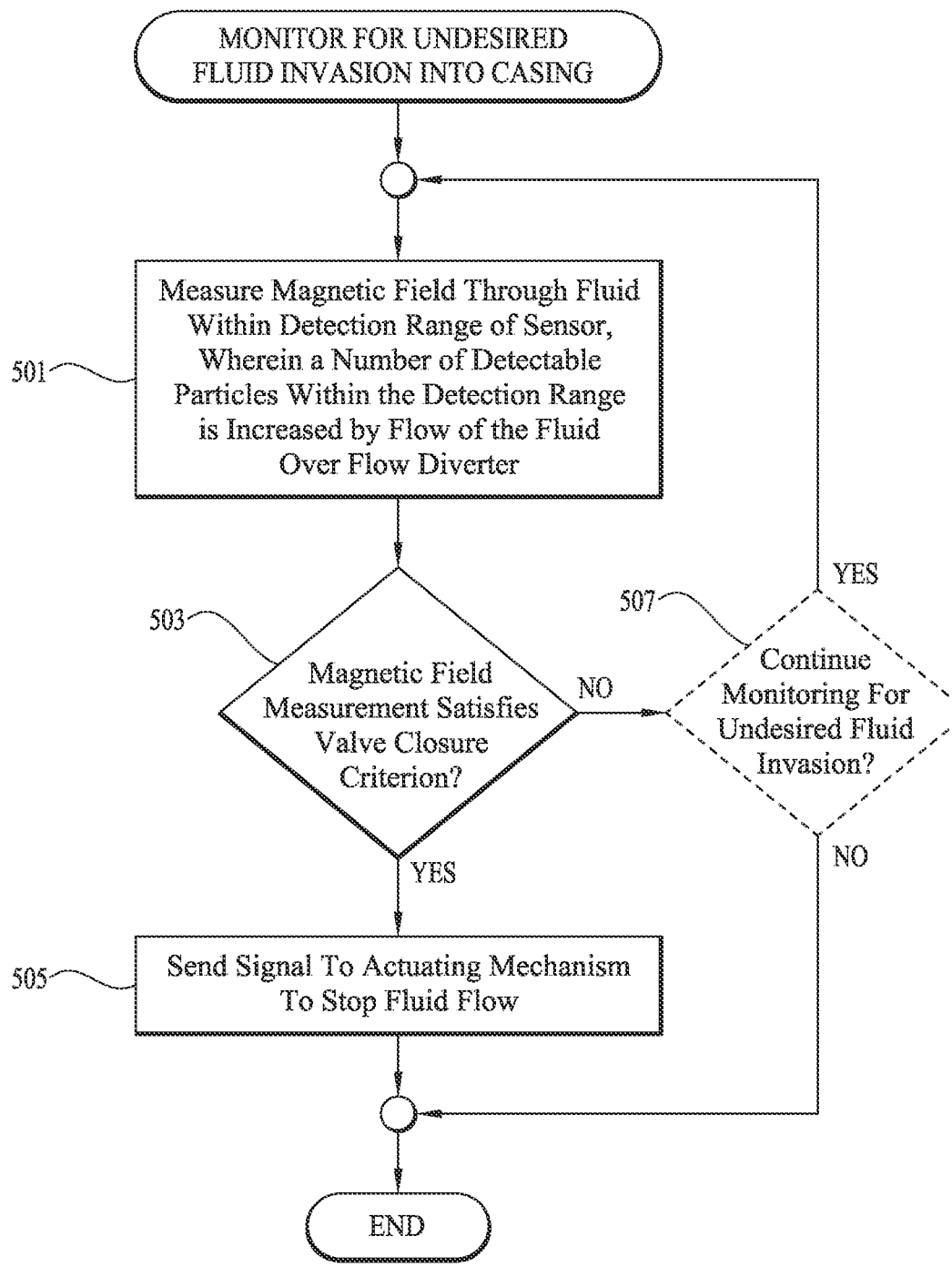
FIG. 6 is a flowchart of example operations for detecting cementing fluid downhole using a flow diverter according to embodiments of this disclosure with a permanent magnet and stopping fluid flow.

FIG. 6 is a flowchart of example operations for monitoring for undesired fluid invasion into a downhole oilfield tubular. This monitoring uses the disclosed flow diverter 100 with sensing apparatus, which includes a magnet source and a magnetic sensor. In the context of reverse cementing operations, the undesired fluid invasion is by a cementing mixture within a slurry. In the context of gravel packing, the undesired fluid invasion is a gravel-laden slurry. In the context of wellbore cleanup, the undesired fluid invasion is a mud. The operations in FIG. 6 are described with reference to a magnetic field sensor and a computing device. These names are for reading convenience and the operations in FIG. 6 can be performed by any component with the functionality described herein.

At block 501, the magnetic sensor measures a magnetic field(s) through a window into the downhole oilfield tubular 180 containing flow diverter 100. The flow diverter 100 effectively increases the number of detectable particles in the fluid F (e.g., the slurry 200) within a detection range X of the sensor S (e.g., magnetic permeability sensor 209 as described herein with reference to FIG. 3 and FIG. 10, magnetic sensor 301 as described herein with reference to FIG. 4, magnetic force sensor 405 as described herein with reference to FIG. 5, or a magnetic field sensor 752 as described herein with reference to FIG. 8). Note that one or more magnetic field sensors could be used. In one application, a plurality of magnetic field sensors is used in order to determine the flow direction. The magnetic field is generated by a permanent magnet or by an electromagnetic. The magnetic field sensor measures the magnetic field that flows from the magnetic source, through the window, and back to the magnetic field sensor. The strength of the measured magnetic field is correlated with the magnetic permeability of the nearby fluid—a fluid with a higher magnetic permeability increases the strength of the magnetic field measured by the magnetic field sensor. The magnetic field sensor can continuously measure magnetic fields or can take measurements according to a schedule (e.g., every minute). The sensing apparatus can begin monitoring for undesired fluid invasion in response to a control signal, a change in temperature, an acoustic signal, or equivalent. For instance, the magnetic sensor or the computing device can receive a signal from the surface to begin measurements at the beginning of reverse cementing operations to preserve battery power. In another instance, the magnetic sensor or the computing device could note a change in the ambient temperature or note a change in the ambient acoustic noise that indicates a need to start measurements, such as from the circulation of a cementing fluid that has a temperature lower than the formation temperature.

At block 503, a computing device communicatively coupled to the magnetic sensor determines whether the magnetic measurement satisfies a criterion for changing the restriction of a valve. As examples, a valve closure criterion can indicate a specified value(s) or a specified range(s) of magnetic field strength. The magnetic sensor transmits measurements of the magnetic strength to the computing device. The computing device receives the measurements and determines whether the target cementing fluid (e.g., a spacer fluid) is present proximate the magnetic sensor. This determination can be based on magnetic field strength being within a certain range of magnetic field strengths known to correspond to a cementing fluid for operational conditions downhole. Alternatively, the determination can be based on a change in magnetic flux above a threshold magnitude. Alternatively, the determination can be based on a pattern of an increase in the magnetic flux followed by a decrease in the magnetic flux during a specified time interval. The computing device can be calibrated to detect multiple types of cementing fluids corresponding to multiple ranges of magnetic flux or based on changes of measured magnetic flux. For instance, the computing device can detect a first cementing fluid and, after an increase of measured magnetic flux above a threshold, can detect a second cementing fluid. Alternatively, after detecting a first cementing fluid the computing device can detect a second cementing fluid based on a decrease of measured magnetic flux above a first threshold and below a second threshold. If the magnetic field measurement satisfies the valve closure criterion, operations continue to block 505. Otherwise, operations continue to block 507.

At block 505, the computing device sends a signal to an actuating mechanism to restrict the fluid flow downhole. The actuating mechanism is located proximate a radial flow port that allows fluid to flow from outside an oilfield tubular to inside the oilfield tubular during reverse cementing operations. The computing device is communicatively coupled to the actuating mechanism and, preferably, in close proximity to the actuating mechanism to minimize delay in the signal and to reduce the chance of communication malfunction. In one embodiment, the actuating mechanism can be as close as 1 inch away from the radial flow port or as far away as 100 feet from the flow port.

At block 507, the computing device determines whether the sensing apparatus should continue to monitor for changes in the magnetic permeability of the fluid. The block 507 is depicted with a dashed line since this determination may be implicit or may be based on an interrupting event (e.g., a message or signal to terminate the monitoring). In some embodiments, determination of whether to continue monitoring may be based on a timing mechanism or a predefined schedule. In some embodiments, there may be a plurality of radial flow ports and plurality of actuating mechanisms.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 501 and 503 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language, and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 7:
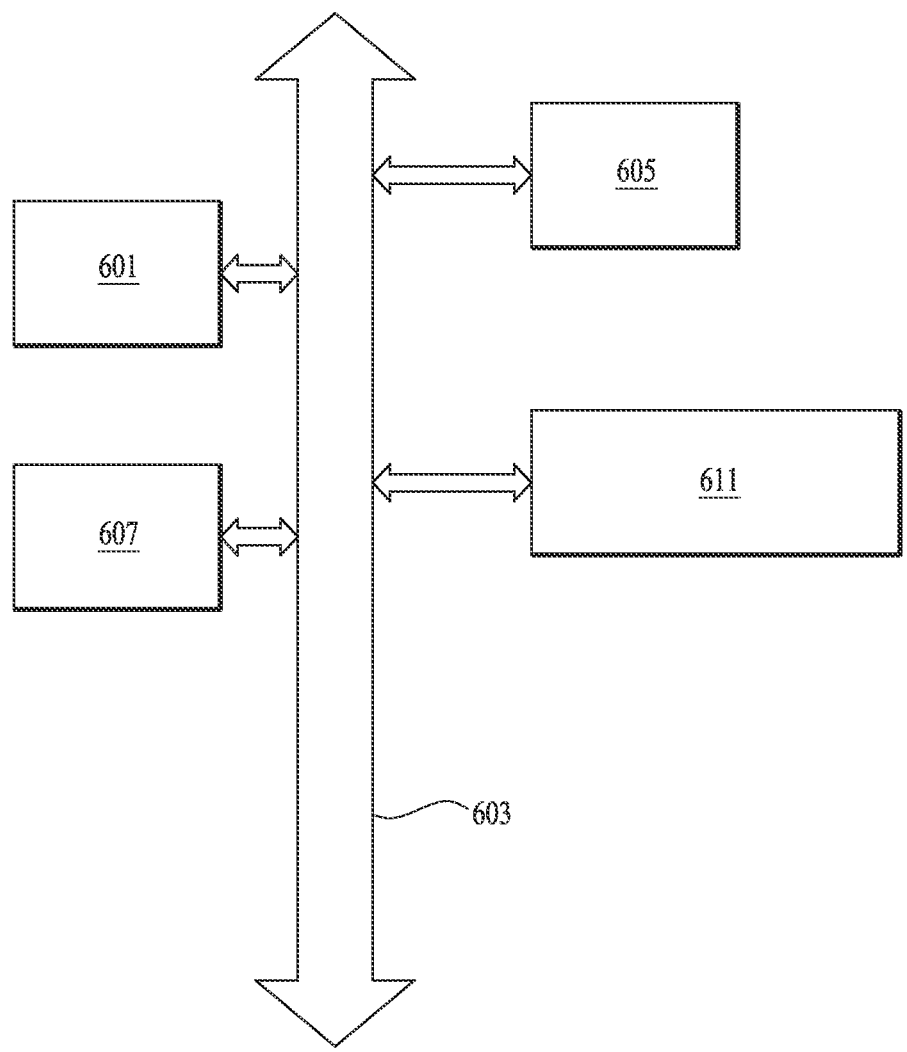
FIG. 7 depicts an example computer system with a sensing apparatus comprising a flow diverter according to embodiments of this disclosure and a permanent magnet and a magnetic field sensor.

FIG. 7 depicts an example computer system with a sensing apparatus comprising a magnet (e.g., a permanent magnet) and a sensor S (e.g., a magnetic field sensor), and a flow diverter 100 of this disclosure utilized to divert fluid flowing over the flow diverter toward the sensor S. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system communicates via transmissions to and/or from remote devices via the network interface 605 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.). The system also includes a sensing apparatus 611 with a magnet (e.g., a permanent magnet) and magnetic sensor S positioned proximal a flow diverter 100 of this disclosure such that fluid flow over flow diverter 100 is directed closer to sensor S. The sensing apparatus 611 detects the presence of ferromagnetic material in a slurry based on the magnetic field emitted by the permanent magnet and magnetic flux readings by the magnetic field sensor as described variously above. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 7 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

Figure 8:
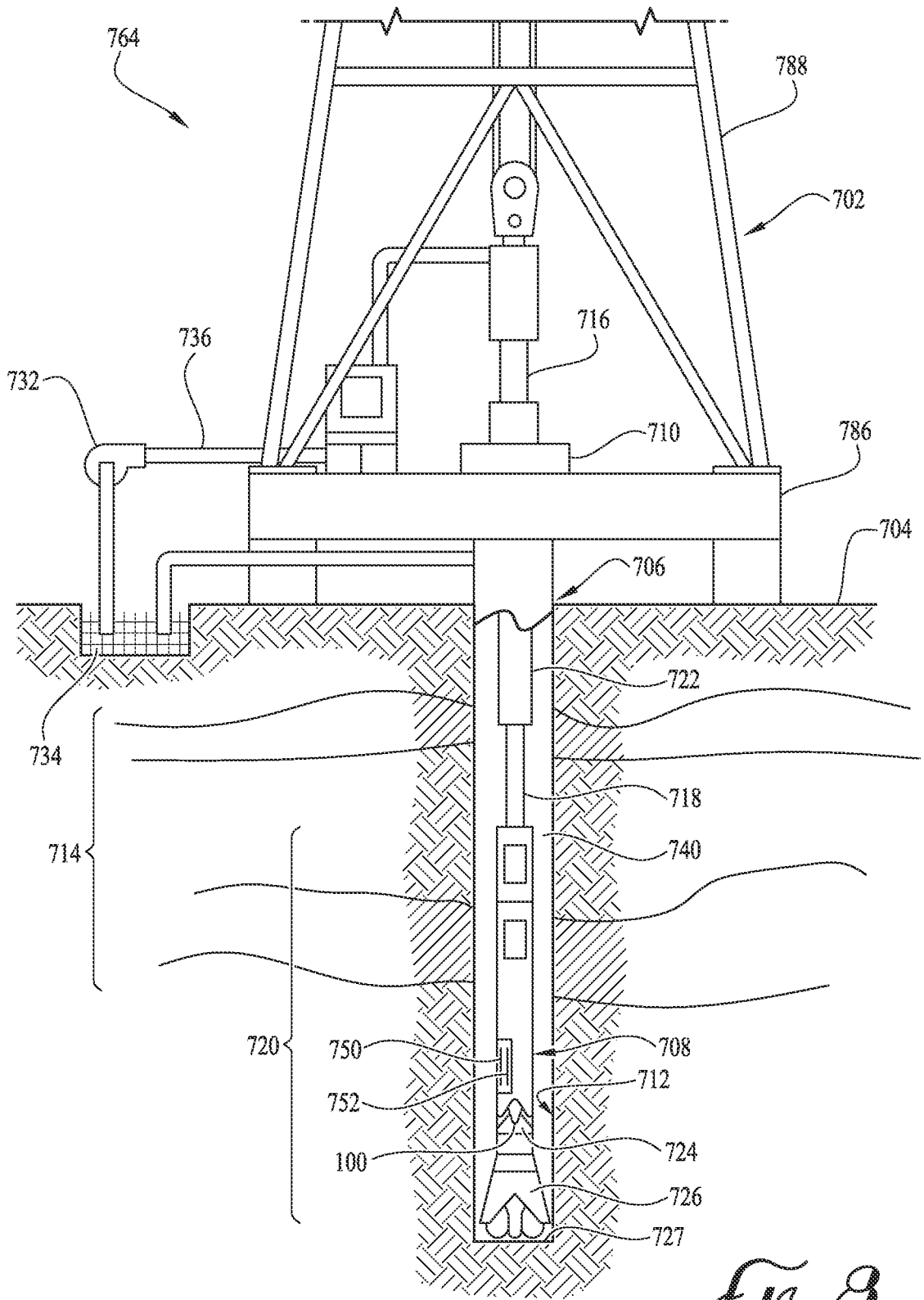
FIG. 8 is a schematic diagram of a drilling rig system with a flow diverter according to embodiments of this disclosure and a magnetic field sensor and a permanent magnet.

FIG. 8 is a schematic diagram of a drilling rig system with a sensing system including a permanent magnet and a magnetic field sensor positioned proximal a flow diverter 100 of this disclosure. For example, in FIG. 8 it can be seen how a system 764 may also form a portion of a rig 702 located at the surface 704 of a well 706. Drilling, testing, and production of oil and gas wells is commonly carried out using a string of pipes connected together so as to form a tubular string 708 that is lowered through a rotary table 710 into a wellbore or borehole 712. Here a rig platform 786 is equipped with a derrick 788 that supports a hoist.

The rig 702 may thus provide support for the tubular string 708. The tubular string 708 may operate to penetrate the rotary table 710 for drilling the borehole 712 through subsurface formations 714. The tubular string 708 may include a Kelly 716, drill pipe 718, and a bottom hole assembly 720, perhaps located at the lower portion of the drill pipe 718.

The bottom hole assembly 720 may include drill collars 722, a downhole tool 724, and a drill bit 726. The drill bit 726 may operate to create a borehole 712 by penetrating the surface 704 and subsurface formations 714. The downhole tool 724 may comprise any of a number of different types of tools including MWD tools, LWD tools, and others.

During drilling operations, the tubular string 708 (perhaps including the Kelly 716, the drill pipe 718, and the bottom hole assembly 720) may be rotated by the rotary table 710. In addition to, or alternatively, the bottom hole assembly 720 may also be rotated by a motor (e.g., a mud motor) that is located downhole. The drill collars 722 may be used to add weight to the drill bit 726. The drill collars 722 may also operate to stiffen the bottom hole assembly 720, allowing the bottom hole assembly 720 to transfer the added weight to the drill bit 726, and in turn, to assist the drill bit 726 in penetrating the surface 704 and subsurface formations 714.

During drilling operations, a mud pump 732 may pump drilling fluid (sometimes known by those of ordinary skill in the art as "drilling mud") from a mud pit 734 through a hose 736 into the drill pipe 718 and down to the drill bit 726. The drilling fluid can flow out from the drill bit 726 and be returned to the surface 704 through an annular area 740 between the drill pipe 718 and the sides of the borehole 712. The drilling fluid may then be returned to the mud pit 734, where such fluid is filtered. In some embodiments, the drilling fluid can be used to cool the drill bit 726, as well as to provide lubrication for the drill bit 726 during drilling operations. Additionally, the drilling fluid may be used to remove subsurface formation 714 cuttings created by operating the drill bit 726. It is the images of these cuttings that many embodiments operate to acquire and process. The drill pipe further comprises a permanent magnet 750 and a magnetic field sensor 752 configured to measure magnetic flux of a slurry inside of the tubular string 708 generated by the magnetic field of the permanent magnet 750 and detect cementing fluids or other operational fluids downhole. Flow diverter 100 is positioned within tubular string 708 such that fluid flow over flow diverter 100 is directed toward magnetic field sensor 752, thus concentrating an amount of detectable particles of taggant T (FIG. 1A) within a detection range X (FIG. 1A) of the magnetic field sensor 752.

Figure 9:
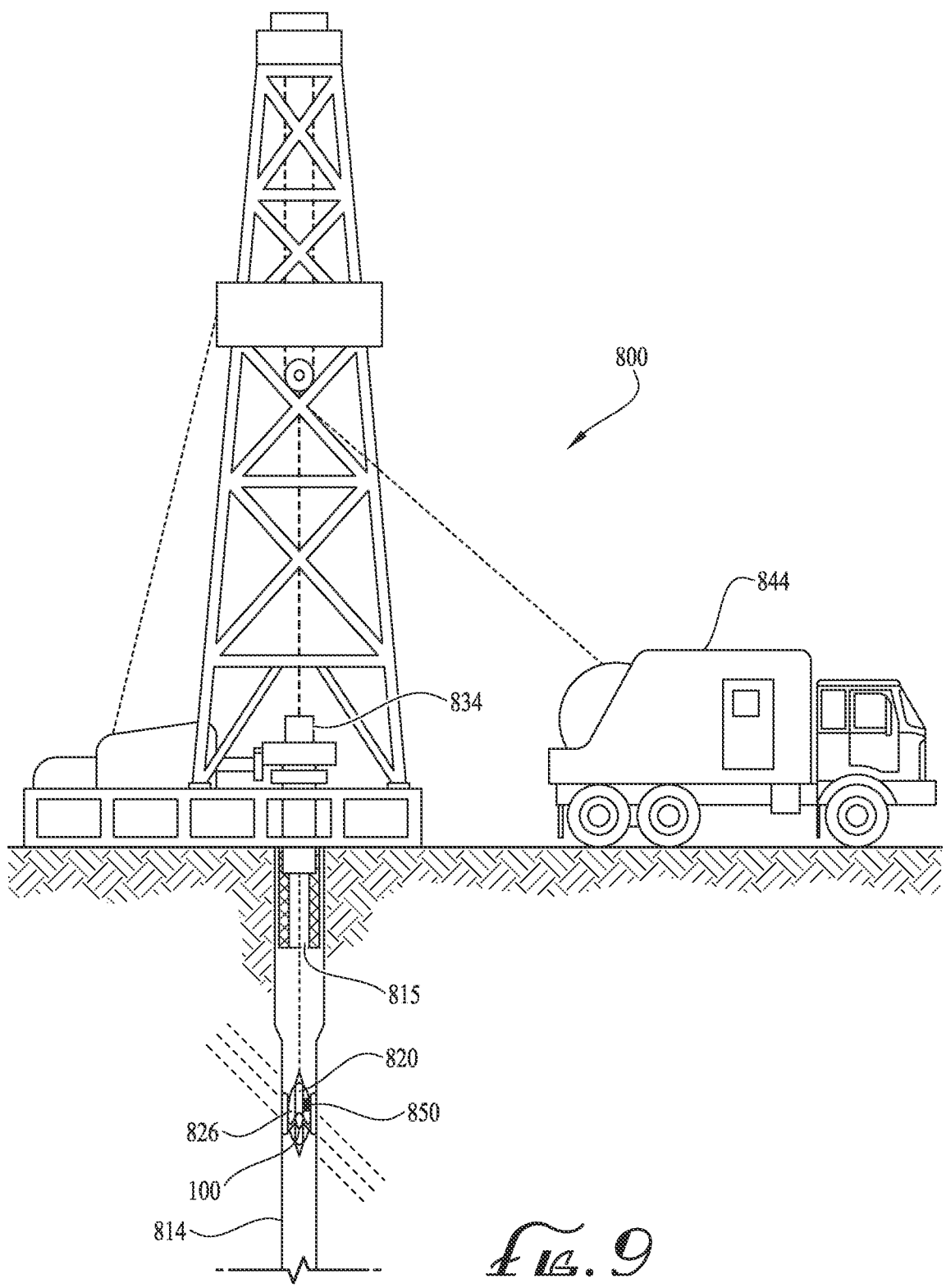
FIG. 9 is a schematic diagram of a wireline system with a flow diverter according to embodiments of this disclosure and a permanent magnet and magnetic field sensor.

FIG. 9 depicts a schematic diagram of a wireline system with a permanent magnet and magnetic field sensor positioned proximal a flow diverter 100 of this disclosure. A system 800 can be used in an illustrative logging environment with a drill string removed, in accordance with some embodiments of the present disclosure.

Subterranean operations may be conducted using a wireline system 820 once the drill string has been removed, though, at times, some or all of the drill string may remain in a borehole 814 during logging with the wireline system 820. The wireline system 820 may include one or more logging tools 826 that may be suspended in the borehole 814 by a conveyance 815 (e.g., a cable, slickline, or coiled tubing). The logging tool 826 may be communicatively coupled to the conveyance 815. The conveyance 815 may contain conductors for transporting power to the wireline system 820 and telemetry from the logging tool 826 to a logging facility 844. Alternatively, the conveyance 815 may lack a conductor, as is often the case using slickline or coiled tubing, and the wireline system 820 may contain a control unit 834 that contains memory, one or more batteries, and/or one or more processors for performing operations and storing measurements. A sensing apparatus 850 comprising a permanent magnet and a magnetic field sensor are affixed to the logging tool 826 and can measure magnetic flux of slurry downhole. The logging tool 826 can detect the presence of a ferromagnetic material based on the measured magnetic flux, as described variously above.

In certain embodiments, the control unit 834 can be positioned at the surface, in the borehole (e.g., in the conveyance 815 and/or as part of the logging tool 826) or both (e.g., a portion of the processing may occur downhole and a portion may occur at the surface). The control unit 834 may include a control system or a control algorithm. In certain embodiments, a control system, an algorithm, or a set of machine-readable instructions may cause the control unit 834 to generate and provide an input signal to one or more elements of the logging tool 726, such as the sensors along the logging tool 826. The input signal may cause the sensors to be active or to output signals indicative of sensed properties. The logging facility 844 (shown in FIG. 9 as a truck, although it may be any other structure) may collect measurements from the logging tool 826, and may include computing facilities for controlling, processing, or storing the measurements gathered by the logging tool 826. The computing facilities may be communicatively coupled to the logging tool 826 by way of the conveyance 815 and may operate similarly to the control unit 834. In certain example embodiments, the control unit 834, which may be located in logging tool 826, may perform one or more functions of the computing facility.

The logging tool 826 includes a mandrel and a number of extendible arms coupled to the mandrel. One or more pads are coupled to each of the extendible arms. Each of the pads have a surface facing radially outward from the mandrel. Additionally, at least sensor disposed on the surface of each pad. During operation, the extendible arms are extended outwards to a wall of the borehole to extend the surface of the pads outward against the wall of the borehole. The sensors of the pads of each extendible arm can detect image data to create captured images of the formation surrounding the borehole. Flow diverter 100 is positioned in logging tool 826 such that fluid flow over flow diverter 100 is directed toward the sensor(s), thus concentrating an amount of detectable particles of taggant T (FIG. 1A) within a detection range X (FIG. 1A) of the sensors.

Figure 10:
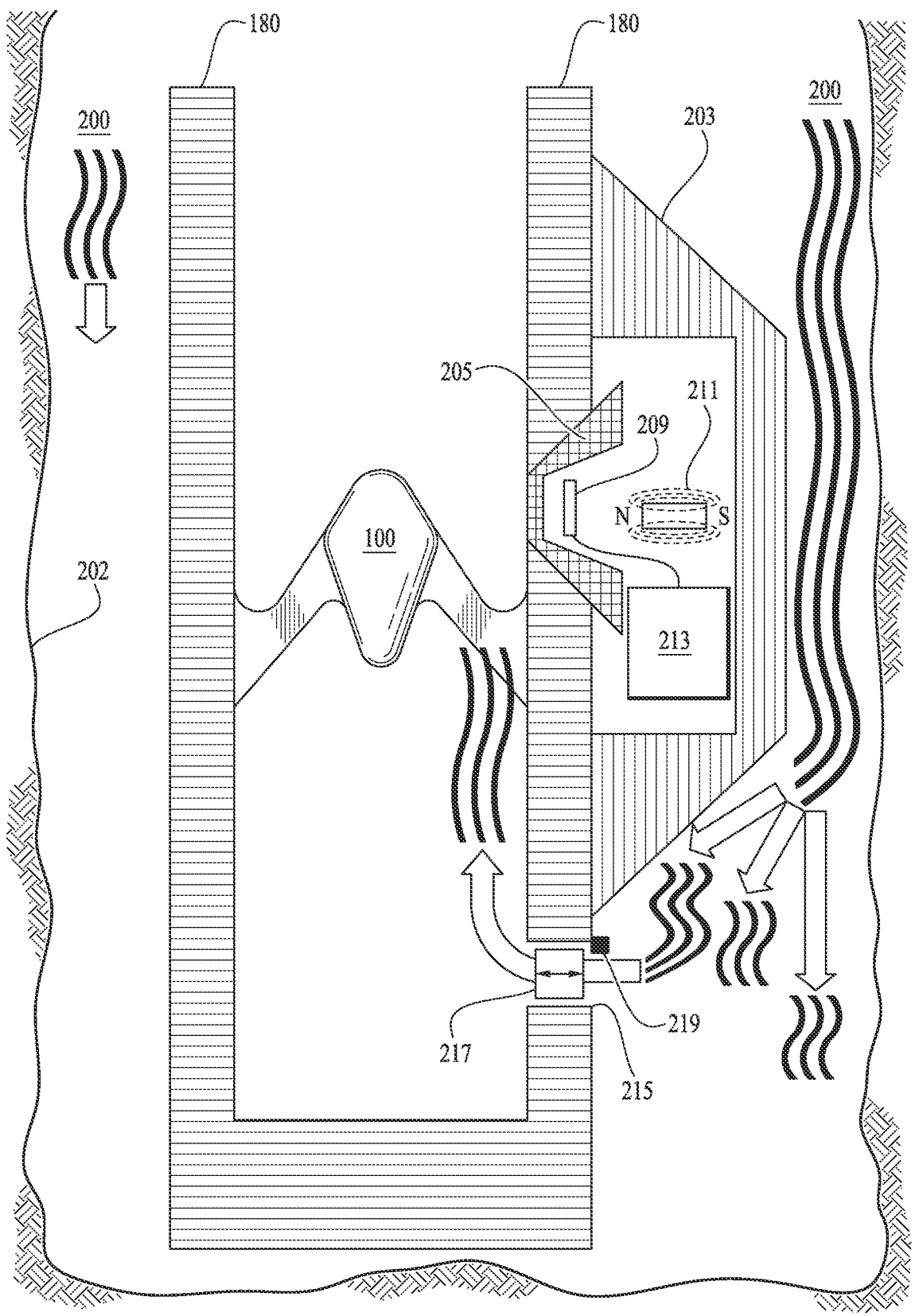
FIG. 10 is a schematic diagram of a flow diverter according to embodiments of this disclosure and a magnetic permeability sensor in a reverse cementing operation without a non-ferromagnetic plug.

FIG. 10 is a schematic diagram of a magnetic permeability sensor proximal a flow diverter 100 of this disclosure in a reverse cementing operation without a non-ferromagnetic plug. The schematic diagram depicted in FIG. 10 is substantially similar to the schematic diagram depicted in FIG. 3, except that the sensor housing 205 does not comprise a plug made of a non-ferromagnetic material. Unlike the sensor housing 205 of FIG. 3, the sensor housing 205 of FIG. 10 does not have a hole or thread to insert a plug. In some embodiments, the sensor housing 205 comprises a non-ferromagnetic material instead of a plug, and magnetic flux generated by the permanent magnet 211 flows through the sensor housing 205, the slurry 200, and back to the magnetic sensor 209. Alternatively, when the sensor housing 205 is not made of a non-ferromagnetic material, the permanent magnet 211 can be a source of stronger magnetic flux so that magnetic flux generated by the permanent magnet is able to flow through the sensor housing 205, to the slurry 200, and back to the magnetic sensor 209. As described with reference to FIG. 3, flow diverter 100 is positioned within tubular 180 such that fluid flow over flow diverter 100 is directed toward sensor 209.

Figure 11:
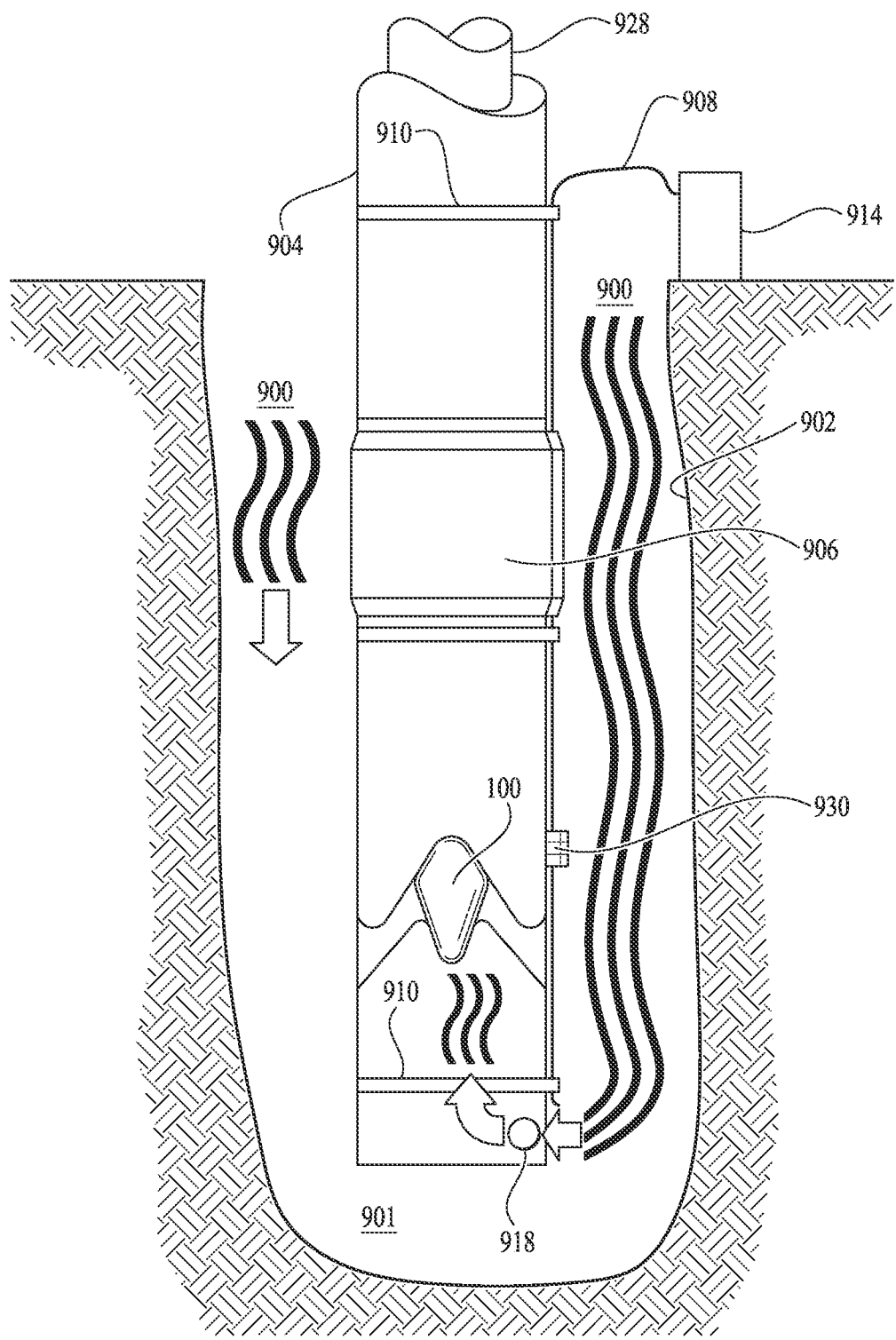
FIG. 11 is a schematic of a reverse cementing operation with a flow diverter according to embodiments of this disclosure and a magnetic permeability sensing apparatus.

FIG. 11 is a schematic of a reverse cementing operation with a flow diverter 100 according to this disclosure proximal a magnetic permeability sensor S of a magnetic permeability sensing apparatus 930. An oilfield tubular 904 runs down a borehole 901 that has been drilled into the earth and that has a borehole wall 902. During cementing operations in the borehole 901, a slurry 900 circulates down the outside of the oilfield tubular 904 and inside the borehole wall 902 towards a valve 918 at the bottom of the oilfield tubular 904. A measurement unit 914 at the surface is communicatively coupled via a wire 908 to various sensors that include a magnetic permeability sensing apparatus 930. The oilfield tubular 904 is formed from lengths of tubing joined by threaded joints 906 and runs the wire 908 downhole with straps 910. As the slurry 900 of wellbore servicing fluid F (e.g., cementitious fluid containing taggant T) enters the inside of the oilfield tubular 904, the magnetic permeability sensing apparatus 930 sends a signal to the measurement unit 914 indicating the presence of the slurry 900 inside of the oilfield tubular 904. Flow of the slurry 900 over the flow diverter 100 increases a concentration of detectable particles within sensing range of the sensor S of magnetic permeability sensing apparatus 930. In response, the measurement unit 914 sends a signal to an actuating mechanism to close the valve 918 and/or terminate/suspend cementing operations. Additionally, the measurement unit 914 can send a signal to an inner liner 928 that runs down the inside of the oilfield tubular 904. The signal causes the inner liner 928 to circulate unnecessary slurry 900 out of the inside of the oilfield tubular 904.

Although depicted with a wire 908 communicatively coupled to the magnetic permeability sensing apparatus 930 and the measurement unit 914, the magnetic permeability sensing apparatus 930 can be communicatively coupled to an actuating mechanism for the valve 918 and can be configured to send a signal to the actuating mechanism to close the valve 918 in response to detecting the presence of the slurry 900. Furthermore, the inner liner 928 can be communicatively coupled to the magnetic permeability sensing apparatus 930 downhole. The magnetic permeability sensing apparatus 930 can send a signal to circulate excess slurry 900 out of the oilfield tubular 904 with the inner liner 928. The wire 908 can run downhole with small diameter tubing or a rigid housing, and multiple wires can be implemented for redundancy. In embodiments where the magnetic permeability sensing apparatus 930 is coupled to the valve 918, the wire 908 is not required.

The slurry 900 of wellbore servicing fluid F (FIG. 1A) can comprise a cementing fluid such as a cement slurry, a spacer, a brine, a mud, or any fluid used during the cementing process (e.g. to cement the outside of the oilfield tubular 904 or to clean cuttings out of the borehole due to drilling). Each cementing fluid in the slurry 900 has a magnetic permeability and the magnetic permeability of each fluid can be modified by adding ferromagnetic material of a prespecified concentration. Modifying one of the cementing fluids, two of the cementing fluids, or all of the cementing fluids are all anticipated by the present disclosure. The measurement unit 914 can be further communicatively coupled to an array of sensors downhole that can measure temperature, pressure, strain, acoustic (noise) spectra, acoustic coupling, chemical (e.g., hydrogen or hydroxyl) concentration, etc. and the wire 908 can be an optic fiber configured for distributed acoustic sensing. Measurements taken by sensors downhole can be used by a controller to guide reverse cementing operations. The magnetic permeability sensing apparatus 930 is depicted as facing towards the inside of the oilfield tubular 904, however the magnetic permeability sensing apparatus 930 can alternatively face the outside of the oilfield tubular 904 to detect the slurry 900 before it enters the inside of the oilfield tubular 904.

With reference now back to FIG. 1, also provided herein is a method comprising: during a wellbore servicing operation, introducing a wellbore servicing fluid F (FIG. 1A) containing taggant T downhole; detecting when the wellbore servicing fluid containing the taggant T arrives at a location within the tubular 180 via a sensing system including a sensor S positioned adjacent an inside surface 181 of the tubular 180, wherein the sensor S is sensitive to the taggant T; and changing an operating condition of the wellbore servicing operation in response to the detecting. Detecting when the wellbore servicing fluid containing the taggant T arrives at the location within the tubular 180 comprises increasing a number of particles of the taggant T within a detection range X (exaggerated in FIG. 1A) of the sensor S by flowing the wellbore servicing fluid past a flow diverter 100 configured to increase the number of the taggant particles within the detection range X of the sensor S. The flow diverter 100 is a flow diverter as described herein.

The taggant T can comprise a magnetic component, such as, and without limitation, hematite, magnetite, or a combination thereof. The sensing system can comprise a magnet that produces a magnetic field in the detection range X and a magnetic sensor S. The sensor S can comprise any sensor as described hereinabove, such as a magnetic permeability sensor, such as magnetic permeability sensor 209 as described with reference to FIG. 3 and FIG. 10, a magnetic sensor 301 as described with reference to FIG. 4, a magnetic force sensor 405 as described with reference to FIG. 5, or a magnetic field sensor 752 as described with reference to FIG. 8.

The flow diverter 100 reduces an amount of taggant T needed in the wellbore servicing fluid to provide a detectable amount of the taggant T particles in the detection range X relative to a same method that does increase the number of taggant T particles within the detection range X of the sensor S. Although not particularly limited, the detection range X can be within about ½" (12.7 mm) to about 1" (25.4 mm) of the inside surface 181 of the tubular 180.

The wellbore servicing operation can comprise a cementing operation, such as, without limitation, a reverse cementing operation. The wellbore servicing fluid F containing the taggant T can comprise a cement slurry (e.g., slurry 200 of FIG. 3). The method can further comprise introducing the cement slurry into an annulus (e.g., such as annulus 740 of FIG. 8) between a wellbore wall (e.g., 712 of FIG. 8) and an outside surface of the tubular 180 (e.g., tubular string 708 of FIG. 8), whereby the cement slurry (e.g., slurry 200 of FIG. 3) enters a downhole end (727 of FIG. 8) of the tubular 180 (e.g., tubular string 708 of FIG. 8).

The flow diverter 100 can be positioned in the tubular 180 with a central axis 150 of the flow diverter 100 substantially parallel and/or coincident with a central axis 150 of the tubular 180. The second conical section 120 can be closer to the downhole end 727 of the tubular 180 than the first conical section 110, for example in embodiments such as depicted in FIG. 2A and FIG. 2B, wherein the second conical section 120 comprises flow diverting features 160 configured to direct fluid flowing past the flow diverting features 160 (e.g., during a reverse cementing operation) toward the sensor 209. In such embodiments, the first conical section 110 may not comprise flow diverting features 160. Alternatively, a flow diverter 100 can be utilized to detect fluid flow during conventional flow down tubular string 708 and out annulus 740. In such embodiment, flow diverter 100 can comprise a first conical section 110 having flow diverting features 160 and a second conical section 120 having or not having flow diverting features 160.

The flow diverter 100 of this disclosure can be utilized with a tubular 180 or downhole tool having an inside diameter 181 sufficient for the further drilling of a wellbore (712, FIG. 8). The difficulty in sensing a strong enough presence of particulate or taggant T with sensor S can be based upon the concentration of the particulate or taggant T in the fluid F. Because the particulates of taggant T being considered can be heavy in comparison to the carrier or base fluid, there are limitations as to how high a concentration of particulates can be employed while maintaining the particulates suspended within the carrier fluid. Too high of a concentration of particulates may also be deleterious to other components found in the casing string. Via this disclosure, rather than further complicating the rheological hierarchies of the fluids being pumped so that increasing concentrations can be utilized, the flow diverter 100 acts as a mechanical concentrator that enables a smaller concentration of particulates to appear much greater as it passes near to the sensor S. That is, a concentration of detectible particulates of taggant T within detection range X of the sensor S is effectively increased via diversion of flow caused by flow diverter 100.

Accordingly, flow diverter 100 reduces the global concentration of particles required for detection by concentrating them near to the sensor S in the wall of the tool. Reducing the initial concentration (e.g., the concentration of taggant in the wellbore servicing fluid F introduced downhole) can improve available options for rheological support of the particles in the fluid F being used for detection by the sensor S. The flow diverter 100 can thus increase a signal strength and reliability of the sensor S to detect the particles of taggant T.

EXAMPLES

The embodiments having been generally described, the following examples are given as particular embodiments of the disclosure and to demonstrate the practice and advantages thereof It is understood that the examples are given by way of illustration and not intended to limit the specification or the claims in any manner.

Comparative Example 1

In this Comparative Example 1, a tubular 180 (e.g. a casing) has an inside diameter $D_1$ of 8.75 inches (22.2 cm), providing a flow area of 60.13 in$^2$ (388 cm$^2$).

Example 1

In this Example, by a flow diverter 100 having a diameter $D_1$ of 4.00 in (10.2 cm) is utilized to reduce the flow area around the flow diverter 100 within tubular 180 (e.g., the casing flow area minus the area of the solid flow diverter 100) to 48 in$^2$ (310 cm$^2$), thus providing an effective increase in particle density of 1.4 times relative to the unobstructed casing (e.g., casing having no flow diverter therein).

Example 2

In this Example 2, a flow diverter 100 having a diameter $D_1$ of 6 inches (15.2 cm) is utilized to reduce the flow area inside tubular 180 to 32 in$^2$ (206 cm$^2$), thus providing a two-fold increase in particle density.

Example 3

In this Example 3, a flow diverter 100 having a diameter $D_1$ of 7 inches (17.8 cm) is utilized within tubular 180 to reduce the flow area to 22 in$^2$ (142 cm$^2$), thus providing a three-fold increase in particle density.

As seen when comparing the flow area of Example 1, Example 2, and Example 3 to the flow area of Comparative Example 1, the flow area within tubular 180 can be adjusted by selecting a flow diverter 100 of a certain size (e.g., a certain outside diameter $D_1$) to create a denser population of taggant T (e.g., magnetite) particles (e.g., a greater number of detectable particles) within detection range X of sensor S.

ADDITIONAL DISCLOSURE

The following are non-limiting, specific embodiments in accordance with the present disclosure:

In a first embodiment, a flow diverter 100 comprises: a first conical section 210; a second conical section 120; and support legs 140, wherein the first conical section 110 comprises an outside surface 111 tapering from a first end 112 to a second end 113 of the first conical section 110, wherein the first end 112 of the first conical section 110 comprises a rounded nose 115, (and optionally, wherein the second end 113 of the first conical section 110 is substantially planar), wherein the second conical section 120 comprises an outside surface 121 tapering from a first end 122 to a second end 123 of the second conical section, wherein the first end 122 of the second conical section 120 comprises a rounded nose 125, (and optionally, wherein the second end 123 of the second conical section 120 is substantially planar), and wherein the support legs 140 are configured to fixedly couple the flow diverter 100 to a tubular 180.

A second embodiment can include the flow diverter of the first embodiment, wherein the support legs 140 are configured to fixedly couple the flow diverter to the tubular such that a central axis 150 of the flow diverter 100 is substantially parallel to a central axis of the tubular.

A third embodiment can include the flow diverter of the first or the second embodiment further comprising flow diverting features 160 configured to direct fluid flowing past the flow diverting features 160 toward an inside surface of the tubular.

A fourth embodiment can include the flow diverter of the third embodiment, wherein the first conical section 110, the second conical section 120, or both comprise the flow diverting features 160, and wherein the flow diverting features 160 extend at least from the rounded nose 115 of the first conical section 110, the rounded nose 125 of the second conical section 120, or both to the second end 113 of the first conical section 110, the second end 123 of the second conical section 120, or both, respectively.

A fifth embodiment can include the flow diverter of the fourth embodiment, wherein the flow diverting features extend past the second end 113 of the first conical section 110, the second end 123 of the second conical section 120, or both to the outside surface 131 of an intermediate section 130, wherein the intermediate section 130 comprises a substantially cylindrical outer surface 131 extending from the second end 113 of the first conical section 110 to the second end 123 of the second conical section 120 (e.g., and having a diameter $D_1$).

A sixth embodiment can include the flow diverter of any one of the third to fifth embodiments, wherein the flow diverting features 160 include flutes, fins, ridges, vanes, recesses, protuberances, or a combination thereof.

A seventh embodiment can include the flow diverter of any one of the first to sixth embodiments comprising from about 3 to about 5 support legs.

An eighth embodiment can include the flow diverter of any one of the first to seventh embodiments, wherein the support legs are distributed substantially equidistantly around the outside surface 131 of the intermediate section 130, the first conical section 110, and/or the second conical section 120.

A ninth embodiment can include the flow diverter of any one of the first to eighth embodiments comprising one or more flow diverting features 160 distributed, between each pair of support legs 140, about the outside surface 111 of the first conical section 110, the outside surface 121 of the second conical section 120, or about both the outside surface 111 of the first conical section 110 and the outside surface 121 of the second conical section 120.

A tenth embodiment can include the flow diverter of any one of the first to tenth embodiments, wherein the flow diverter comprises a material selected from plastics, aluminum (e.g., cast aluminum, wrought aluminum), steel (e.g., in applications of a well structure not requiring drillout), or a combination thereof.

An eleventh embodiment can include the flow diverter of the tenth embodiment, wherein the material comprises a phenolic or thermoset plastic.

In a twelfth embodiment, a downhole tool comprises: the flow diverter of any one of the first to eleventh embodiments fixedly coupled with the tubular; and a sensor adjacent the flow diverter.

A thirteenth embodiment can include the downhole tool of the twelfth embodiment, wherein the tubular comprises a casing, a casing shoe, a tool having a body, and a sensor proximally located within the body (e.g., between maximum outside diameter 182 and minimum inside diameter 181 of the tubular 180 of the tool body configuration).

A fourteenth embodiment can include the downhole tool of any one of the twelfth or thirteenth embodiment, wherein the flow diverter 100 is fixedly coupled with the tubular via one or more holes 170 on each of the support legs 140.

A fifteenth embodiment can include the downhole tool of the fourteenth embodiment, wherein the flow diverter 100 is fixedly coupled with the tubular via a set screw in each of the one or more holes 170 on each of the support legs 140.

A sixteenth embodiment can include the downhole tool of anyone of the twelfth to fifteenth embodiments, wherein the sensor comprises a magnet.

A seventeenth embodiment can include the downhole tool of the sixteenth embodiment, wherein the sensor comprises a magnetic permeability sensor, and the magnet comprises a permanent magnet.

In an eighteenth embodiment, a method comprises: during a wellbore servicing operation, introducing a wellbore servicing fluid containing taggant downhole; detecting when the wellbore servicing fluid containing the taggant arrives at a location within the tubular via a sensor positioned adjacent an inside surface of the tubular, wherein the sensor is sensitive to the taggant; and changing an operating condition of the wellbore servicing operation in response to the detecting, wherein detecting when the wellbore servicing fluid containing the taggant arrives at the location within the tubular comprises increasing a number of particles of the taggant within a detection range of the sensor by flowing the wellbore servicing fluid past a flow diverter configured to increase the number of the taggant particles within the detection range of the sensor.

A nineteenth embodiment can include the method of the eighteenth embodiment, wherein the flow diverter is a flow diverter according to any one of the first to eleventh embodiments.

A twentieth embodiment can include the method of any one of the eighteenth or nineteenth embodiments, wherein the taggant comprises a magnetic component.

A twenty first embodiment can include the method of the twentieth embodiment, wherein the taggant comprises hematite, magnetite, or a combination thereof.

A twenty second embodiment can include the method of any one of the eighteenth to twenty first embodiments, wherein the sensor comprises a magnet that produces a magnetic field in the detection range.

A twenty third embodiment can include the method of any one of the eighteenth to twenty second embodiments, wherein the flow diverter reduces an amount of taggant needed in the wellbore servicing fluid to provide a detectable amount of the taggant particles in the detection range relative to a same method that does increase the number of taggant particles within the detection range of the sensor.

A twenty fourth embodiment can include the method of any one of the eighteenth to twenty third embodiments, wherein the detection range is within about ½" (12.7 mm) to about 1" (25.4 mm) of the inside surface of the tubular.

A twenty fifth embodiment can include the method of any one of the eighteenth to twenty fourth embodiments, wherein the wellbore servicing operation comprises cementing operation.

A twenty sixth embodiment can include the method of the twenty fifth embodiment, wherein the cementing operation comprises a reverse cementing operation.

A twenty seventh embodiment can include the method of any one of the twenty fifth or twenty sixth embodiments, wherein the wellbore servicing operation comprising the taggant comprises a cement slurry.

A twenty eighth embodiment can include the method of the twenty seventh embodiment further comprising introducing the cement slurry into an annulus between a wellbore wall and an outside surface of the tubular, whereby the cement slurry enters a downhole end of the tubular.

A twenty ninth embodiment can include the method of any one of the twenty seventh or twenty eighth embodiments, wherein the flow diverter is positioned in the tubular with a central axis 250 of the flow diverter substantially parallel with a central axis of the tubular, and with the second conical section closer to the downhole end of the tubular than the first conical section, and wherein the second conical section comprises flow diverting features configured to direct fluid flowing past the flow diverting features toward the sensor.

A thirtieth embodiment can include the method of the twenty ninth embodiment, wherein the first conical section does not comprise flow diverting features.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded. Use of the phrase "at least one of" preceding a list with the conjunction "and" should not be treated as an exclusive list and should not be construed as a list of categories with one item from each category, unless specifically stated otherwise. A clause that recites "at least one of A. B, and C" can be infringed with only one of the listed items, multiple of the listed items, and one or more of the items in the list and another item not listed.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A flow diverter comprising:
a first conical section;
a second conical section;
flow diverting features configured to direct fluid flowing past the flow diverting features toward an inside surface of a tubular; and
support legs,
wherein the first conical section comprises an outside surface tapering from a first end to a second end of the first conical section, wherein the first end of the first conical section comprises a rounded nose,
wherein the second conical section comprises an outside surface tapering from a first end to a second end of the second conical section, wherein the first end of the second conical section comprises a rounded nose,
wherein the support, legs are configured to fixedly couple the flow diverter to the tubular,
wherein the first conical section, the second conical section, or both comprise the flow diverting features,
wherein the flow diverting features extend at least from the rounded nose of the first conical section, the rounded nose of the second conical section, or both to the second end of the first conical section, the second end of the second conical section, or both, respectively,
wherein the flow diverting features extend past the second end of the first conical section, the second end of the second conical section, or both to an outside surface of an intermediate section, and
wherein the intermediate section comprises a substantially cylindrical outer surface extending from the second end of the first conical section to the second end of the second conical section.

2. The flow diverter of claim 1, wherein the support legs are configured to fixedly couple the flow diverter to the tubular such that a central axis of the flow diverter is substantially parallel to a central axis of the tubular.

3. The flow diverter of claim 1, wherein the flow diverting features include flutes, fins, ridges, vanes, recesses, protuberances, or a combination thereof.

4. The flow diverter of claim 1, wherein the support legs are distributed substantially equidistantly.

5. The flow diverter of claim 1, wherein the support legs each comprise leading and trailing edges which are contoured to provide smooth flow of fluid past the support legs.

6. The flow diverter of claim 1, wherein the flow diverter is configured to be readily drillable.

7. A downhole tool comprising:
a flow diverter configured to coupled within a tubular, wherein the flow diverter is configured to be disposed within the tubular to increase effective concentration of solids in a fluid within the tubular which are in proximity to the flow diverter; and
a sensor adjacent and in proximity to the flow diverter, wherein the sensor is configured to detect solids in the fluid in proximity to the flow diverter,
wherein the flow diverter comprises:
a first conical section;
a second conical section; and
support legs,
wherein the first conical section comprises an outside surface tapering from a first end to a second end of the first conical section, wherein the first end of the first conical section comprises a rounded nose,
wherein the second conical section comprises an outside surface tapering from a first end to a second end of the second conical section, wherein the first end of the second conical section comprises a rounded nose, and
wherein the support legs are configured to fixedly couple the flow diverter to the tubular.

8. The downhole tool of claim 7, wherein the tubular comprises a casing, a casing shoe, a tool having a body, and a sensor proximally located within the body.

9. The downhole tool of claim 7, wherein the flow diverter is fixedly coupled with the tubular via one or more holes on each of the support legs.

10. The downhole tool of claim 9, wherein the flow diverter is fixedly coupled with the tubular via a set screw in each of the one or more holes on each of the support legs.

11. The downhole tool of claim 7, wherein the sensor comprises a magnet.

12. The downhole tool of claim 11, wherein the sensor comprises a magnet permeability sensor, and the magnet comprises a permanent magnet.

13. A method comprising:
positioning a flow diverter in a tubular;
positioning a sensor adjacent an inside surface of the tubular, wherein the sensor is disposed in proximity to the flow diverter and is sensitive to taggant;
during a wellbore servicing operation, introducing a wellbore servicing fluid containing the taggant downhole in the tubular;
detecting when the wellbore servicing fluid containing the taggant arrives at a location within the tubular via the sensor; and
changing an operating condition of the wellbore servicing operation in response to the detecting,
wherein detecting when the wellbore servicing fluid containing the taggant arrives at the location within the tubular comprises concentrating a number of particles of the taggant within a detection range of the sensor by flowing the wellbore servicing fluid past the flow diverter in the tubular configured to concentrate the number of the taggant particles within the detection range of the sensor.

14. The method of claim 13, wherein the taggant comprises a magnetic component.

15. The method of claim 14, wherein the sensor comprises a magnet that produces a magnetic field in the detection range.

16. The method of claim 13, wherein the wellbore servicing operation comprises a cementing operation.

17. The method of claim 16, wherein the cementing operation comprises a reverse cementing operation.

18. The method of claim 16, wherein the wellbore servicing fluid containing the taggant comprises a cement slurry, and wherein the method further comprises introducing the cement slurry into an annulus between a wellbore wall and an outside surface of the tubular, whereby the cement slurry enters a downhole end of the tubular.

19. The method of claim 18, wherein the flow diverter comprises a first conical section and a second conical section, wherein the flow diverter is positioned in the tubular with a central axis of the flow diverter substantially parallel with a central axis of the tubular, and with the second conical section closer to the downhole end of the tubular than the first conical section, and wherein the second conical section comprises flow diverting features configured to direct fluid flowing past the flow diverting features toward the sensor.

20. The method of claim 13, further comprising selecting a size of the flow diverter configured to provide meaningful increase in concentration of taggant in the fluid to improve detection with the sensor.

* * * * *